United States Patent [19]

Huspeni et al.

[11] Patent Number: 5,492,946
[45] Date of Patent: Feb. 20, 1996

[54] LIQUID CRYSTALLINE POLYMER BLENDS AND MOLDED ARTICLES THEREFROM

[75] Inventors: Paul J. Huspeni, Dahlonega; John F. Petry, Alpharetta; Roger W. Nelson, Roswell; Steven R. Dunkle, Alpharetta, all of Ga.

[73] Assignee: Amoco Corporation, Chicago, Ill.

[21] Appl. No.: 281,920

[22] Filed: Jul. 28, 1994

Related U.S. Application Data

[63] Continuation of Ser. No. 814,866, Dec. 30, 1991, abandoned, which is a continuation-in-part of Ser. No. 499,482, Jun. 4, 1990, Pat. No. 5,079,289.

[51] Int. Cl.$^6$ .............................. C08L 67/03; C08L 67/04
[52] U.S. Cl. ............................. 524/12; 524/14; 524/34; 524/406; 524/413; 524/424; 524/436; 524/437; 524/439; 524/441; 524/444; 524/445; 524/449; 524/451; 524/452; 524/456; 524/494; 524/539; 525/132; 525/444

[58] Field of Search ...................... 525/444, 132; 524/539, 494, 12, 14, 34, 406, 413, 424, 436, 437, 439, 441, 444, 445, 449, 451, 452, 456

[56] References Cited

U.S. PATENT DOCUMENTS

| | | | |
|---|---|---|---|
| 4,414,365 | 11/1983 | Sugimoto | 525/437 |
| 4,563,508 | 1/1986 | Cottis | 525/444 |
| 5,079,289 | 1/1992 | Layton | 524/600 |
| 5,089,594 | 2/1992 | Stern | 528/194 |

*Primary Examiner*—Patricia A. Short
*Attorney, Agent, or Firm*—Richard J. Schlott; Stephen L. Hensley

[57] ABSTRACT

A molded article having improved weld line strength, fabricated from a polymer blend composition comprising at least one liquid crystalline polymer and at least one additional polymer, wherein the composition has a crystallization rate lower than said at least one liquid crystalline polymer.

13 Claims, 2 Drawing Sheets

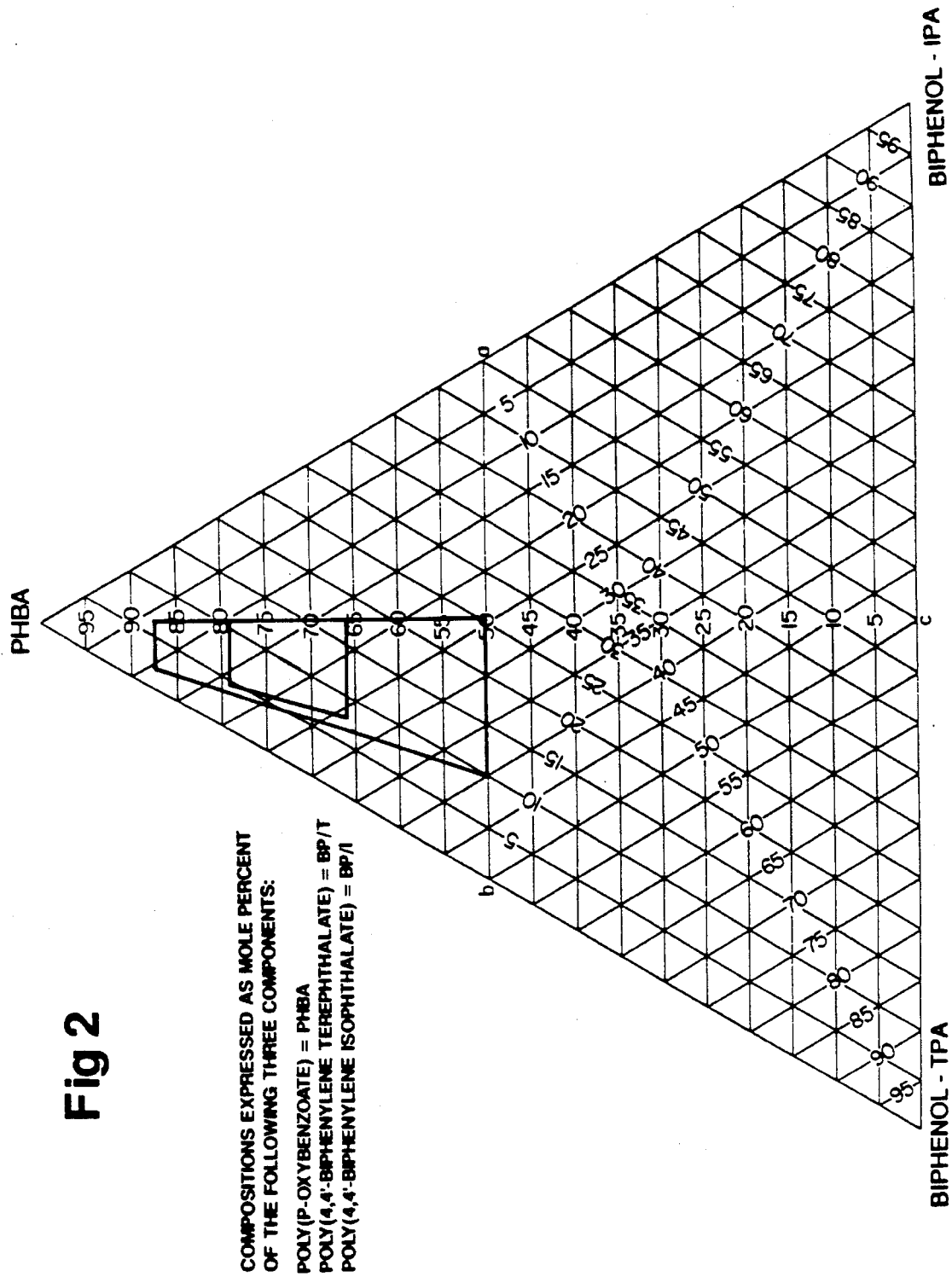

LIQUID CRYSTALLINE POLYMER BLENDS AND MOLDED ARTICLES THEREFROM

CROSS-REFERENCE TO RELATED APPLICATIONS

This application is a continuation of U.S. application Ser. No. 07/814,866, filed Dec. 30, 1991, now abandoned, which was a CIP of U.S. application Ser. No. 07/499,482, filed Jun. 4, 1990, now U.S. Pat. No. 5,079,289.

BACKGROUND OF THE INVENTION

1. Field of the Invention

The present invention relates generally to anisotropic melt-forming polymers (i.e., "liquid crystalline polymers" or simply "LCPs") and, more particularly, to blends of LCPs suitable for injection molding thin-walled molded articles, e.g., electrical connectors, having excellent weld-line strength and reduced warpage.

As an article of manufacture, the present invention is directed to molded articles having improved weld line strength, wherein the articles are fabricated from a polymer blend composition comprising at least one liquid crystalline polymer and at least one additional polymer, wherein the composition has a crystallization rate lower than said at least one liquid crystalline polymer.

The invention is based on our discovery that a given LCP composition which otherwise provides only marginal weld line strength can be markedly improved with respect to this property, by adding a second polymer, preferably another LCP, to obtain a blend which has a lower crystallization rate than at least one, and preferably each, of the LCP components of the blend. Such a blend has also been found to provide a reduction in warpage in the molded part.

As a composition of matter, the invention is directed to certain polymeric blends suitable for use in fabricating the molded articles of the invention. The blends comprise a first component comprising repeating units derived from terephthalic acid, isophthalic acid, p-hydroxybenzoic acid, hydroquinone and an arylene diol other than hydroquinone, (e.g., biphenol), in which the relative molar amounts of the units are such that the first component polyester falls approximately within the bounded regions shown in the triangular diagram of the accompanying FIG. 1.; and a second component, different from the first, comprising a wholly aromatic liquid crystalline polyester. Polyesters represented by the lower bounded region of FIG. 1 are particularly preferred as the first component in the blends of the present invention. A particularly preferred second component polymer of the blends is a copolyester comprising units derived from terephthalic acid, isophthalic acid, p-hydroxybenzoic acid and biphenol, wherein the relative molar amounts of the units are such that the composition falls approximately within the outer bounded region shown in the triangular diagram of FIG. 2. Polyesters within the inner bounded region are particularly preferred. Also preferred as the second component are copolyesters wherein at least one repeating ester unit comprises a naphthalene moiety.

The present invention is particularly advantageous for molding thin-walled electrical connectors which in the past have shown a tendency to break along the connector weld lines under typical conditions of assembly (i.e. pin insertion) where the connector must be incorporated into or assembled with other workpieces.

2. Background Discussion

Polymers capable of forming an anisotropic melt are well-known in the art, and are generally termed "liquid crystalline polymers" or "LCPs". The term "anisotropic" results from the finding, well documented in the literature, that the rod-like molecular chains characteristic of LCPs have a tendency in the molten or dissolved state to become unidirectionally aligned (i.e., "oriented") in parallel fashion. Evidence of this type of ordered structure includes the finding in the art that these materials are able to transmit light in optical systems equipped with crossed polarizers, whereas transmission of light is theoretically zero for isotropic materials. This distinguishing optical property, as well as a test for determining its existence in polymers, is discussed in numerous patents and publications. For example, reference may be had to the paper of R. Demartino entitled "Improved Processing of Thermotropic Liquid Crystalline Polyesters" which appeared in the Journal of Applied Polymer Science, Volume 28, pp. 1805–1810 (1983). Examples from the patent literature where the optical properties of LCPs and the measurement thereof have been discussed include Luise U.S. Pat. No. 4,274,514, at column 7, line 66 to column 10 line 26; and Maier et al. U.S. Pat. No. 5,015,689, at column 3, line 36 to column 4, line 2.

The tendency of LCPs toward anisotropic behavior in the melt distinguishes these polymers from the isotropic (disordered) behavior of most other molten polymers. A general discussion of thermotropic liquid crystalline polymers (the term "thermotropic" refers to LCPs which are ordered in the molten phase) can be found in the paper of H. Lingau et al. entitled "Thermotropic Liquid Crystal Polymers" published in Kunstoffe German Plastics 79 (1989) 10, pp. 81–83; and the paper of W. J. Jackson entitled "Liquid Crystal Polymers. XI. Liquid Crystal Aromatic Polyesters: Early History and Future Trends" published in Mol. Cryst. Liq. Cryst., 1989, Vol. 169, pp. 23–49.

The characteristic orientation of the LCP molecular chains in the molten state is preserved when the LCPs are processed into molded articles, fibers or films. Hence, the resulting products generally exhibit superior mechanical properties over conventional folded chain polymers. LCPs in which all of the repeating units comprise an aromatic ring (substituted or unsubstituted), i.e.:

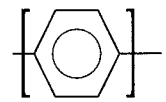

are termed wholly aromatic and have become well recognized in the art for their high temperature properties and toughness.

Another known benefit of injection moldable LCP polymers is the fact that their anisotropic behavior results in polymer melts having low viscosities compared to isotropic melt-forming polymers. The combination of high temperature performance, toughness, and the ability to form a relatively low viscosity melt, makes LCPs, and in particular the wholly aromatic LCPs, uniquely well suited for injection molding of thin-walled articles, such as electrical connectors, which must be strong but also capable of withstanding the temperature extremes encountered in vapor phase and infra-red soldering of electrical components. Some molded electrical components have fine structural details where the component may have wall thicknesses of not greater than about 0.03 inches. Thin-walled parts of this type would otherwise be very difficult to fill in the mold were it not for low viscosity polymers such as the commercially available LCPs. Examples of such LCPs are the oxybenzoyl copolyesters sold by Amoco Performance Products, Inc. under the tradename Xydar® and those sold by Hoechst-Celanese under the tradename Vectra®. Among the many patents which exemplify oxybenzoyl LCPs are Cottis et al U.S. Pat. Nos. 3,637,595 and 3,975,487; and Calundann U.S. Pat. No. 4,160,470. The term "oxybenzoyl" means that the LCP has a recurring unit which is derived from p-hydroxybenzoic acid:

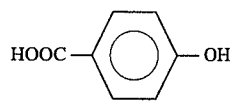

Although LCPs such as the wholly aromatic oxybenzoyl copolyesters are uniquely suited to the molding of thin-walled electrical connectors, a well-known problem that has often been encountered in such molding is the tendency for the molded connector to exhibit a reduction in strength at any point where two or more molten resin flow fronts meet or join following injection of the resin into the mold. Such meeting points can be present if the mold contains one or more centrally located structure-defining barriers around which the injected resin must flow to fill the mold. They can also occur if resin is injected into the mold from more than one point of entry or gate. The boundary region where separate resin fronts flow together in the mold is commonly termed a "weld line" or a "knit-line". Unfortunately, it is generally known in the art that weld line quality in LCPs can be poorer than that of conventional thermoplastics. See, e.g., H. Bangert "Mouldings Produced from Liquid Crystal Polymers" Kunstoffe 79 (1989) 12, pp. 1327–1333. Hence, in the finished part, weld lines have been found to be areas of reduced strength where, under the stresses applied in manufacturing or use, the molded part may be more likely to undergo failure. Although weld line strength can in some instances be improved by adjusting the mold design, the position of the injection points, and other processing parameters, these ad hoc measures can be costly, inconvenient and generally must be tailored to each individual product. Therefore, need exists in the art for LCP compositions which exhibit an improvement in weld-line strength without regard to mold design or processing parameters.

Another problem encountered in the use of LCPs for injection molding of thin-walled articles is the occasional tendency for the molded part to display an unacceptable degree of warpage upon cooling after ejection from the mold. Although the problem of warpage can be controlled to some degree with appropriate fillers or through mold design, there remains a need for LCP compositions which exhibit better resistance to warpage.

A still further area where improvement in LCP compositions is sought is with respect to certain demanding applications where the injection molded part must undergo severe stresses during the manufacture of an article incorporating the molded part. In such instances it is desired to improve the ductility or toughness of LCPs, as measured in terms of properties such as tensile elongation. Manufacturers may frequently refer to "latch strength" when indicating the ability of a molded part to resist breakage during the assembly of an electrical product. Improvements in ductility are desired for improving the latch strength of electrical parts.

In view of the foregoing discussion, a general object of the present invention is to provide an improved LCP composition and molded articles therefrom. A further object is to provide an LCP composition which exhibits improved weld line strength. Still another object is to provide an LCP composition which exhibits a reduction in warpage. Other objects will become apparent hereinafter to those skilled in the art.

BACKGROUND ART

Insofar as the present invention concerns blends of LCPs, the additional brief background discussion which now follows is provided for a better understanding of the state of the art concerning LCP blends. These previously known blends do not address the problems noted above and are readily distinguishable from the present invention.

Cottis et al., U.S. Pat. No. 4,563,508, disclose that molding properties of molding compounds based on wholly aromatic oxybenzoyl polyesters are improved by addition to such polyester compositions of a minor amount of an aromatic polyester which can comprise units derived from terephthalic acid, p-hydroxybenzoic acid, hydroquinone, isophthalic acid and biphenol. The broadest description of the added polyester in Cottis '508 describes a great many possible compounds in which the presence of units derived from hydroquinone and terephthalic acid is optional. In those instances where hydroquinone is present, the ratio of hydroquinone to biphenol is up to about 2.33:1. The first component in the blends of Cottis '508 is preferably a copolyester of terephthalic acid, para-hydroxybenzoic acid and biphenol in 1:2:1 molar ratio. The second component of the blends is preferably a copolyester of isophthalic acid, p-hydroxybenzoic acid and biphenol in a mole ratio of 1:1–5:1. The patent examples disclose blends containing particulate filler (talc and TiO2) and the injection molding of trays having a thickness of 0.073 inches. The patent does not disclose or suggest the blends or molded articles of the present invention, nor does it address the problems solved by the present invention.

M. DeMeuse et al., in a paper entitled "Studies of the Structure of Blends Containing Two Liquid-Crystal Polymers" from *Polymers for Advanced Technologies Volume* 1, pp. 81–92 (1990) disclose blends containing a copolyester based on p-hydroxybenzoic acid and hydroxynaphthoic acid (73:27) and a copolyester based on hydroxynaphthoic acid, terephthalic acid and hydroquinone (50:25:25). In this paper the authors concluded that compatibility between polymers which form similar mesophases may not be observed often, in contrast with the case of low-molecular weight liquid crystals.

M. DeMeuse et al., in the paper entitled "Investigations into the Structure of Liquid Crystalline Polymer-Liquid Crystalline Polymer Blends" published in *ACS Symposium Series*, 435, at pp. 439–457 (1990) disclose blends in which the first component is a polymer based on p-hydroxybenzoic acid and hydroxynaphthoic acid (73:27) and in which the second component is a polymer based on p-hydroxybenzoic acid, hydroxynaphthoic acid, terephthalic acid and hydroquinone (57:41:1:1). This paper supports the conclusion that LCP polymer blend compatibilities are unpredictable.

Commonly assigned PCT Application Nos. WO 90/04001, 04003 and 04002 disclose LCP blends in which the first component polyester is based on copolyesters derived from hydroquinone, biphenol, terephthalic acid, isophthalic acid and p-hydroxybenzoic acid; and wherein the second component polyester comprises naphthalene moieties. These publications do not exemplify LCP blends in which the first component comprises a copolyester based on terephthalic acid, isophthalic acid, p-hydroxybenzoic acid, hydroquinone and biphenol, and where the second component is a polyester without repeating naphthalene units. These publications also do not exemplify LCP blends in which the first component LCP resin has the particular compositional requirements preferred for use in the blends and molded articles of the present invention.

European Patent Application No. 376,615 discloses LCP compositions which can be molded into an article having small thickness, wherein the composition is a blend of a first LCP component having molecular weight of about 10,000 to 200,000 and a second LCP having weight average molecular weight of about 1000 to 7000. This patent discloses blends in which the low molecular weight second component (MW 3500) is a polymer based on p-hydroxybenzoic acid and hydroxynaphthoic acid (70:30). This component was blended with the following polymers based on p-hydroxybenzoic acid (PHBA), hydroxynaphthoic acid (HNA), isophthalic acid (IA), terephthalic acid (TA), biphenol (BP), and hydroquinone (HQ):

| PHBA/HNA | 70/30 |
| PHAB/HNA/IA/HQ | 60/20/10/10 |
| PHBA/HNA/TA | 60/20/20 |
| PHBA/HNA/TA | 70/26/4 |
| PHBA/BP/TA/IA | 65/15/15/5 |
| PHBA/HNA/IA/HQ | 35/5/30/30 |

Froix U.S. Pat. No. 4,267,289 discloses blends of two melt processible wholly aromatic polyesters capable of forming an anistropic melt phase apart from the blend, comprising (a) approximately 5–95 percent by weight of a first polyester comprising not less than approximately 10 mole percent of recurring units which include a naphthalene moiety and (b) a second polyester capable of forming an anistropic melt phase at a temperature no higher than approximately 320° C. apart from the blend consisting essentially of recurring units derived from p-hydroxybenzoic acid, 1,2-ethylenedioxy-4,4'-dicarboxylic acid, terephthalic acid and substituted hydroquinone.

Yamauchi et al. Japanese Patent No. 1,058,428 based on Application No. 48(1973)-42398 disclose blends of a homopolymer based on p-hydroxybenzoic acid and another polyester based on terephthalic and/or isophthalic acid, para-hydroxybenzoic acid and hydroquinone.

BRIEF DESCRIPTION OF THE DRAWINGS

In the accompanying drawings forming part of the specification;

FIG. 2 is a simplified graphical representation of polyester compositions in terms of molar percent of components p-oxybenzoyl units, biphenol-terephthaloyl units and biphenol-isophthaloyl units.

SUMMARY OF THE INVENTION

Figure 1:
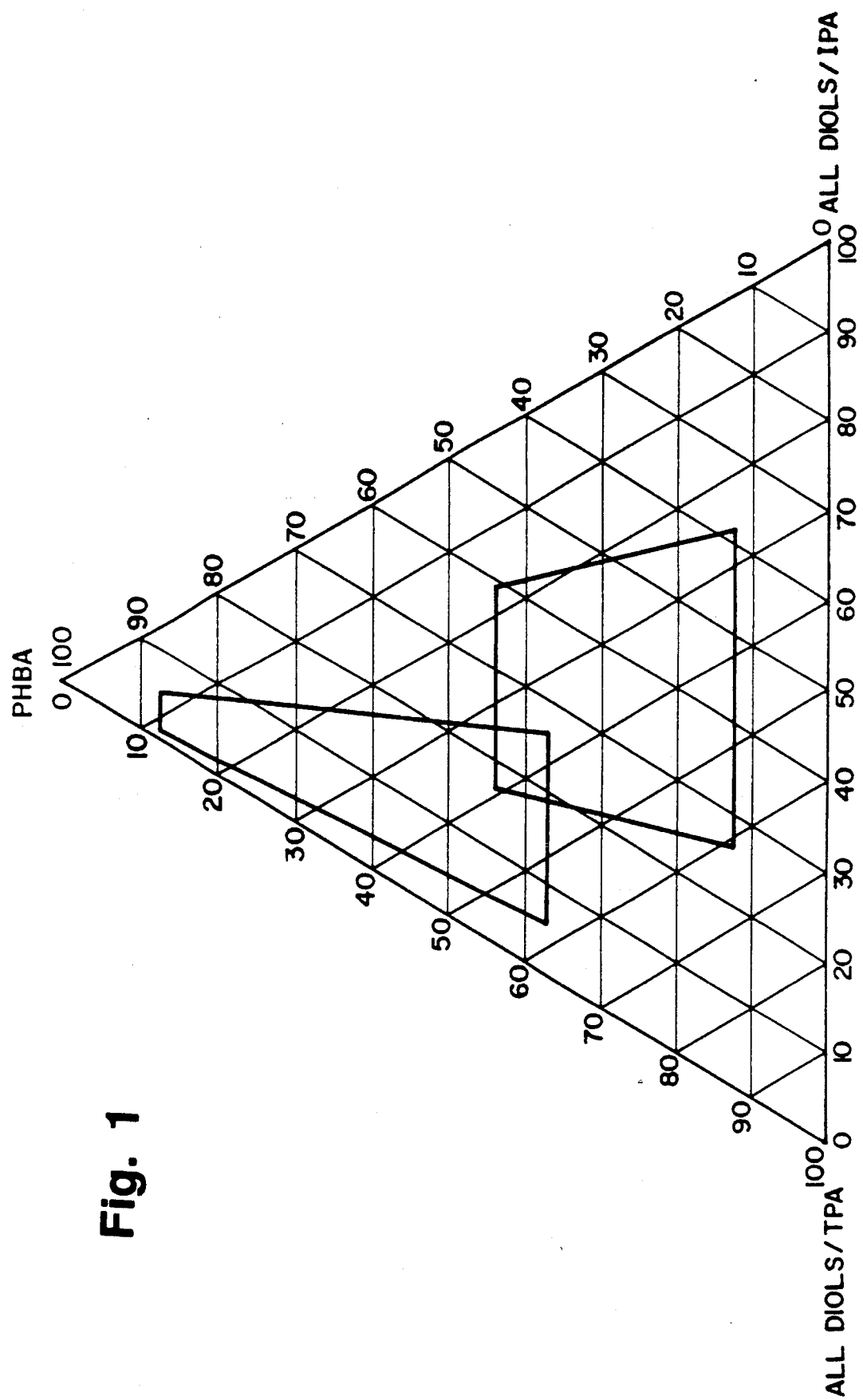
FIG. 1 is a simplified graphical representation of polyester compositions in terms of molar percent of p-oxybenzoyl units, diol-terephthaloyl units and diol-isophthaloyl.

We have now discovered that the objects stated above can be realized in molded articles having improved weld line strength, fabricated from a polymer blend composition comprising at least one liquid crystalline polymer and at least one additional polymer, wherein the composition has a crystallization rate lower than said at least one liquid crystalline polymer. Preferably, the crystallization rate of the polymer blend composition is lower than each of the individual liquid crystalline polymers constituting the blend, and the polymer blend composition comprises a non-particulate filler, preferably long chopped glass fiber having an aspect ratio of about 10 to about 100, and more preferably about 7 to about 30, in an amount of from about 1 to about 70% based on the weight of the composition. A preferred loading is about 20 to about 50 wt %. In conjunction with the reduced crystallization rate of the blend used to fabricate the molded article, the aspect ratio of the non-particulate filler permits a preferred cross-mingling of the filler throughout the boundary region of the article's weld lines for added improvements in weld line strength. The molded articles of the invention encompass thin-walled electrical connectors comprising at least one thin-walled section having thickness not greater than about 0.03 inches. Molded articles manufactured in accordance with the present invention also exhibit a reduced tendency to warp after ejection from the mold.

The invention is further directed to an injection molding process for obtaining molded articles having improved weld line strength, said process comprising the step of injecting into a mold a molten polymeric blend composition comprising at least one liquid crystalline polymer and at least one additional polymer, wherein the composition has a crystallization rate lower than said at least one liquid crystalline polymer, and wherein said molten polymeric composition, after injection, comprises separate flow fronts which merge into one another to form the molded article.

The term "liquid crystalline polymer" as used throughout this specification should generally be understood to denote any polymer capable of forming an oriented (anisotropic) melt. Suitable LCPs include, without limitation, wholly and partially aromatic polyesters, oxybenzoyl polyesters, polyester carbonates, polyester amides, polyazomethines, polythioesters etc.

The present invention is based upon our discovery that the LCP blends having a lower crystallization rate than at least one, and preferably each of the individual LCP components, can dramatically improve weld strength and warpage in molded articles; as compared with articles prepared from one of the components when such component is used as the sole resin component. It is further preferred that the blend have a lower crystallization temperature than the individual components. Blends which utilize such crystallization phenomena are particularly advantageous for molding thin-walled electrical connectors, typically having structural portions of not greater than about 0.030 inches. Such connectors have otherwise shown a tendency to break or fail along the connector weld lines under typical conditions of use (e.g., pin insertion). Such typical conditions include numerous stresses which have to be applied to the connector in the course of the manufacturing steps required to combine or assemble the connector with other electrical components.

Particularly preferred blends resulting in molded articles having an improved capability of withstanding the types of stresses noted above are blends according to the present invention which comprise a first component comprising a wholly aromatic polyester in which are present the repeating units (1), (2), (3), 4) and (5):

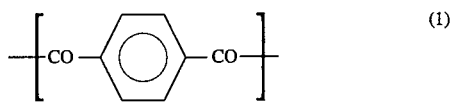

(1)

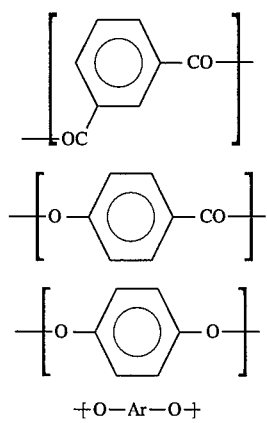

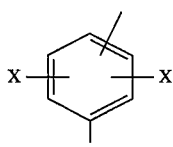

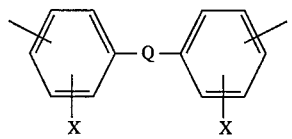

+O—Ar—O+ (5)

where —Ar— comprises at least one member selected from the group consisting of (I), a divalent substituted mononuclear aromatic radical of the formula:

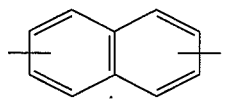

wherein X is independently hydrogen, a $C_1$ to $C_5$ alkyl group, a halide atom or an aryl group; with the proviso that when the valence bonds are para to each other at least one group X must be other than hydrogen; and (II), a divalent dinuclear aromatic radical of the formula:

(II)

wherein X is as previously defined, and Q is a chemical bond, or is selected from the group consisting of O, S, SO, S—S, $SO_2$ and CO; and (III), a divalent naphthalene radical of the formula:

(III)

wherein the ratio of total number of units (1) to the total number of units (2) is from about 0.42:1 to about 2.33:1, and preferably about 0.75:1 to about 2:1; the ratio of the total number of units 4) to the total number of units (5) is from about 1:1 to about 99:1, and preferably about 5:1 to about 99:1, and more preferably about 10:1 to about 70:1; and the ratio of the total number of units (3) to the sum of the total number of units (1) and (2) is from about 0.15:1 to about 0.8:1, and preferably about 0.25:1 to about 0.75:1. A first component polyester having these compositional parameters is represented graphically in the lower bounded region of FIG. 1.

Other first component polyesters for use in the blends of the invention comprise polyesters having the above units (1) to (5) wherein the ratio of total number of units (1) to the total number of units (2) is from about 1.4:1 to about 10:1, preferably about 1.5:1 to about 5:1; the ratio of the total number of units 4) to the total number of units (5) is from about 3:1 to about 21:1, and preferably about 3.5:1 to about 20:1; and the ratio of the total number of units (3) to the sum of the total number of units (1) and (2) is from about 0.6:1 to about 7:1, and preferably about 0.7:1 to about 4:1. A first component polyester having these compositional parameters is represented graphically in the upper bounded region of FIG. 1.

The second component of the blends of the invention preferably comprises a liquid crystalline polyester, different from the first component polymer, selected from the group consisting of:

(a) polyester resin consisting of (1) repeating units derived from at least one dicarboxylic acid selected from the group consisting of alicyclic dicarboxylic acids, and dicarboxylic acids comprising at least one non fused-ring aromatic moiety; and (2) repeating units derived from at least one diol selected from the group consisting of alicyclic diols, aliphatic diols, and diols comprising at least one non fused-ring aromatic moiety;

(b) polyester resin consisting of repeating units derived from one or more hydroxy-carboxylic acids comprising at least one non fused-ring aromatic moiety; and (c) polyester resin consisting of (1) repeating units derived from at least one dicarboxylic acid selected from the group consisting of alicyclic dicarboxylic acids, and dicarboxylic acids comprising at least one non fused-ring aromatic moiety; and (2) repeating units derived from at least one diol selected from the group consisting of alicyclic diols, aliphatic diols, and diols comprising at least one non fused-ring aromatic moiety; and (3) repeating units derived from one or more hydroxy-carboxylic compounds comprising at least one non fused-ring aromatic moiety;

A blend according to the present invention which is particularly preferred because of its ability to achieve outstanding weld line integrity and reduced warpage when used to mold electrical connectors, is a blend having a first component as described above and a second component comprising an oxybenzoyl copolyester from the above category (c) in which there are present repeating units derived from terephthalic acid, isophthalic acid, p-hydroxybenzoic acid and biphenol wherein (i) the sum total of units derived from isophthalic acid and terephthalic acid is approximately equal to the sum total of units derived from biphenol; (ii) the ratio of the total number of units derived from terephthalic acid to the total number of units derived from isophthalic acid is from about 1:1 to about 4:1; and (iii) the ratio of the total number of units derived from p-hydroxybenzoic acid to the total number of units derived from biphenol is from about 1:1 to about 7:1, and preferably about 2:1 to about 4:1. These compositional parameters for the preferred second component in the blends of the invention are approximated graphically by the bounded region of the triangular diagram shown in the accompanying FIG. 2.

An additional preferred blend of the present invention resulting in molded parts having excellent high temperature properties, excellent weld line strength, and reduced warpage, is a blend in which the first component is as described above and wherein a second component polymer comprises a wholly aromatic polyester different from the first and comprises at least one recurring unit derived from compounds selected from the group consisting of naphthalene dicarboxylic acids, hydroxynaphthoic acids or dihydroxynaphthalenes. Examples of wholly aromatic polyesters comprising such recurring naphthalene-derived units are disclosed, e.g., in U.S. Pat. Nos. 4,161,470; 4,184,996; and 4,256,624, which are incorporated by reference. Examples of commercially available polyesters containing repeating naphthalene-based units which can be used as the second component in the blends of the invention are the Vectra® A-950 and E-950 (neat resins) and their glass-filled counterparts, Vectra® A-130® and E-130®, which are sold by Hoechst-Celanese.

In the above blends of the present invention, the weight ratio of the first component to the second component is about 1:100 to 100:1, and preferably about 1:9 to about 9:1. More preferably, for articles in which overall toughness is the principal consideration, the ratio should be from about 1:9 to about 1:2; whereas, for articles in which a greater emphasis is placed on reduction in warpage, a preferred ratio is about 2:1 to about 9:1.

The LCP blends of the present invention summarized above may be found to be compatible with other engineering polymers which may or may not be LCPs. In this regard, we have made the additional important discovery that the blends of the invention can be further enhanced by the incorporation of about 1–50 wt. percent of polyetherimide, based on the resinous portion of the blends. More particularly, we have found that molded articles can be improved with respect to ductility (i.e. toughness) as measured by tensile elongation. Thus, while the bi-component LCP blends as described herein exhibit excellent weld strength, resistance to warpage and overall toughness for a great many applications, the addition of polyetherimide as a third component results quite surprisingly in a ternary blend in which the polyetherimide is compatible with the bi-component LCP blend described above. This ternary blend provides molded articles, in particular thin-walled electrical connectors, capable of satisfying stringent tensile elongation requirements. Molded electrical connectors may have to have increased ductility in order to withstand a variety of stresses applied to the connectors when they are assembled into an electrical product. For example, some connectors must be latched or snapped together to complete an electrical circuit. The ability of the part to resist breakage in this type of use is frequently referred to as "latch strength". Also, electrical connectors typically have holes into which are inserted connector pins. The ability of the part to withstand pin insertion, and to maintain a tight fit with the pins over time, is another measure of the toughness and ductility of the material. Finally, connectors may also have locating pins to aid rapid assembly into an electrical product. Greater ductility and toughness is required to prevent undesired breakage of such locating pins during manufacturing and handling of the electrical connectors. Examples of polyetherimide suitable for use in the ternary blends of the present invention are disclosed in Rock U.S. Pat. No. 4,871,817 and Peters et al. U.S. Pat. No. 4,965,337, which are incorporated by reference. An example of a commercially available polyetherimide suitable for use as the polyetherimide component in the ternary blends of the present invention is the product sold by General Electric Company under the tradename Ultem® 1000.

The binary and ternary blends described in the present invention are quite surprising because, with some known exceptions, blends of polymeric materials are generally different from the respective polymers. They are immiscible, that is, they consist of domains of chemically distinct phases. Usually, one component forms a continuous phase, while the other component forms roughly spherical domains as inclusions. Under some circumstances, bi-continuous structures are also obtainable. Mixing two arbitrarily chosen polymers usually results in inferior materials having no utility, because, in the absence of adhesion between phases, the dispersed phase merely weakens the continuous phase. Hence, a blend of two polymers is usually a two-phase system whose properties reflect those of both phases present. On the other hand, a random copolymer is a one-phase material wherein the properties of the constituents are averaged. Thus, a copolymer is expected to be quite different from a two-phase blend. Even if the monomers employed to make the component polymers of the blend were to be the same as those employed to make the corresponding random copolymer, one would not expect similar characteristics for the two systems. The incorporation into blends of polymers at least one of which exhibits an ordered structure leads to an increased tendency of the blends to separate into phases. This is believed to be due to the fact that the order found in certain regions of the resin causes a fairly sharp boundary between the domains of the molecules of the component polymers.

Apart from the advantages noted above with respect to weld strength, warpage and ductility, the blends and molded articles of the invention, are cost competitive due to their ability to successfully utilize the less expensive monomer hydroquinone in relatively high amounts (versus the more costly biphenol). Moreover, the ability to use lower levels of p-hydroxybenzoic acid versus terephthalic acid and isophthalic acid is an additional economic advantage.

DETAILED DESCRIPTION

The following detailed discussion is divided into four sections. Section I is a discussion of polymers suitable as the first component in the blends of the present invention; Section II is a discussion of polymers suitable as the second component in the blends; Section III addresses the manufacture of molded articles according to the invention; and Section IV discusses the analytical techniques used in connection with invention.

I. The First Component

The first component LCP in the blends of the present invention comprises a wholly aromatic polyester comprising the repeating units (1), (2), (3), 4) and (5):

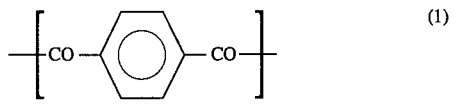

(1)

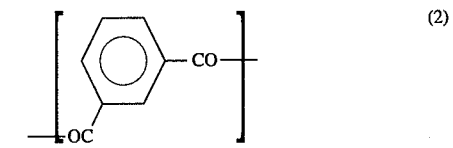

(2)

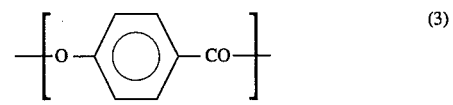

(3)

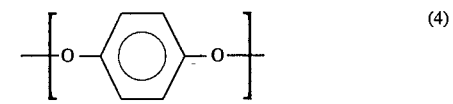

(4)

(5)

where —Ar— comprises at least one member selected from the group consisting of (I), a divalent substituted mononuclear aromatic radical of the formula:

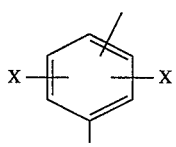

wherein X is independently hydrogen, a $C_1$ to $C_5$ alkyl group, a halide atom or an aryl group; with the proviso that when the valence bonds are para to each other at least one group X must be other than hydrogen; and (II), a divalent dinuclear aromatic radical of the formula:

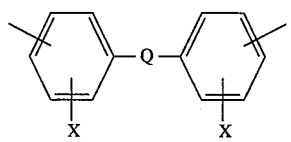

wherein X is as previously defined, and Q is a chemical bond, or is selected from the group consisting of O, S, SO, S—S, $SO_2$ and CO; and (III), a divalent naphthalene radical of the formula:

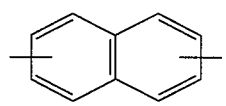

wherein the ratio of total number of units (1) to the total number of units (2) is from about 0.42:1 to about 2.33:1, and preferably about 0.75:1 to about 2:1; the ratio of the total number of units 4) to the total number of units (5) is from about 1:1 to about 99:1, and preferably about 5:1 to about 99:1, and more preferably about 10:1 to about 70:1; and the ratio of the total number of units (3) to the sum of the total number of units (1) and (2) is from about 0.15:1 to about 0.8:1, and preferably about 0.25:1 to about 0.75:1. A first component polyester having these compositional parameters is represented graphically in the lower bounded region of FIG. 1. With reference to the triangular diagram of FIG. 1, it should be understood that the coordinates for each point within the lower bounded region define a copolyester in terms of molar percentages of p-oxybenzoyl units (top of triangle), diol-terephthaloyl units (lower left of triangle) and diol-isophthaloyl units (lower right of triangle). For purposes of the present invention, a given first component polyester composition having units (1) to (5) can be assigned a point on the triangular diagram using the following conversions:

$$\% \text{ PHBA} = \frac{(c)}{(a)+(b)+(c)} \times 100$$

$$\% \text{ all diols/TPA} = \frac{(a)}{(a)+(b)+(c)} \times 100$$

$$\% \text{ all diols/IPA} = \frac{(b)}{(a)+(b)+(c)} \times 100$$

where the terms "PHBA", "all diols/TPA" and "all diols/IPA" refer to the three compositional parameters of the triangular diagram of FIG. 1 and wherein (a) represents moles of terephthaloyl units; (b) represents moles of isophthaloyl units; and (c) represents moles of oxybenzoyl units Other polyesters which are suitable for use as the first component polyester comprise units (1) to (5) as described above wherein the ratio of total number of units (1) to the total number of units (2) is from about 1.4:1 to about 10:1, preferably about 1.5:1 to about 5:1; the ratio of the total number of units (4) to the total number of units (5) is from about 3:1 to about 21:1, and preferably about 3.5:1 to about 20:1; and the ratio of the total number of units (3) to the sum of the total number of units (1) and (2) is from about 0.6:1 to about 7:1, and preferably about 0.7:1 to about 4:1. For convenience, the range of first component polyesters meeting the above definition are approximated graphically by the upper bounded region of FIG. 1.

In the above polyesters, the mono-nuclear aromatic ring of units (1), (2), or (3), or the moiety

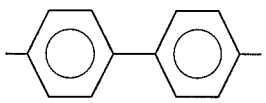

of unit (5), can be replaced with a naphthalene ring in up to about 25% of the total of units (1), (2), (3), or (5).

Generally speaking, the wholly aromatic LCPs suitable for use as the first blend component can be prepared using the bulk condensation technique described in commonly assigned Cottis et al., U.S. Pat. No. 3,637,595; Finestone, U.S. Pat. No. 4,742,149; and Matzner et al. U.S. Pat. No. 5,066,767. The foregoing patents are incorporated by reference.

The bulk condensation of aromatic polyesters as described in the above-referenced patent literature generally involves an alkanoylation step in which a suitable dicarboxylic acid, hydroxybenzoic acid and diol are reacted with an acid anhydride; a prepolymerization step in which the reaction product of the first step is polycondensed to prepare a prepolymer; and a heating step in which the prepolymer is heated under agitation to produce a polycondensate of the desired degree of polymerization.

In somewhat greater detail, copolyesters suitable as the first component in the blends of the present invention can be prepared by charging into a suitable reaction vessel appropriate amounts of isophthalic and terephthalic acids, p-hydroxybenzoic acid, hydroquinone and diol. An anhydride of a lower, preferably a $C_2$ to $C_4$ monocarboxylic acid, is added in at least stoichiometric amounts. It is most preferred to use acetic anhydride in an amount which is preferably from about 5 to about 20 mole percent in excess of that required for the acetylation of all of the hydroxyl groups. The acetylation reaction takes place at about 100° to about 200° C. and preferably about 120° to about 150° C., for a period of time of from about 2 to about 6 hours. The reaction mixture is then heated to about 240°–320° C. at a rate of from about 10 to about 40° C. per hour, and is kept at about 240° to 320° C. for approximately a few minutes to about 4 additional hours. The obtained low molecular weight polymer is then solid-state advanced to the required high molecular weight by heating at about 260° to about 320° C. for a period of from about 1 to about 24 hours under vigorous agitation. Such vigorous agitation may be carried out in a manner as generally described in Fisher U.S. Pat. No. 3,254,053 and British Patent No. 1,341,446, which are incorporated herein by reference.

A preferred variant as described in Finestone, U.S. Pat. No. 4,742,149, comprises adding a salt, particularly an alkaline earth metal salt or an alkali metal salt, preferably potassium sulfate, during the preparation of the resin, and particularly to the prepolymer melt prior to advancement of the final product to the desired degree of polymerization. The incorporation of stabilizing amounts of phosphites, as described in Cottis, U.S. Pat. No. 4,639,504, may also be carried out.

The first blend component polyesters tend to be substantially insoluble in all common polyester solvents such as hexafluoroisopropanol and o-chlorophenol, and accordingly are not susceptible to solution processing. They can, however, be readily processed using melt processing techniques which are well known in the art.

The first component polyesters commonly exhibit weight average molecular weights of about 2,000 to about 200,000, preferably about 10,000 to about 50,000 and most preferably about 20,000 to about 25,000. These molecular weights are determined by techniques that do not involve solutioning of the polymer, e.g., by endgroup determination, and the like.

The above described polyesters suitable for use as the first component in the blends of the invention display an excellent overall combination of mechanical and thermal properties. The subject materials show melting points that are in the range of from about 280° C. to as high as about 400° C. Their thermal stability is excellent. Heat distortion temperatures (HDTs) are at least about 200° C. when measured under a load of 264 psi. The polyesters display high modulus and strength, as well as good retention of properties at high temperatures.

Aromatic copolyesters suitable as the first component of the blends of the invention and falling approximately within the upper and lower compositional regions of FIG. 1 are disclosed in commonly assigned U.S. Ser. No. 499,481 (allowed) and its published foreign counterpart WO 90/03992 incorporated by reference.

II. The Second Component

Broadly speaking, the second component of the blends of the present invention must comprise an LCP different from the first component, and the incorporation of the second component with first must produce a blend which has a lower crystallization rate than at least one of the LCP components, and more preferably, both the first and the second component. To maximize weld line strengthening in molded articles, it is further preferred that the crystallization temperature of the blend be lower than the second component, or more preferably, both the first and the second component.

The second blend component can comprise, for example, wholly and partially aromatic polyesters, oxybenzoyl polyesters, polyester carbonates, polyester amides, polyazomethines, polythioesters, etc., with the proviso that such polymers are liquid crystalline polymers different from the polymer of the first component.

The requirement that the second component polymer of the blends of the invention be liquid crystalline means that the polymer forms an anisotropic melt phase whereby an atypical degree of order is manifest in the molten polymer. The subject polymer readily forms liquid crystals in the melt phase and accordingly exhibits a high tendency for the polymer chains to orient in the shear direction. Such anisotropic properties are manifest at a temperature which is amenable for melt processing to form shaped articles. For example, such order in the melt may be confirmed by conventional polarized light techniques whereby crossed polarizers are utilized. More specifically, the anisotropic melt phase may conveniently be confirmed by the use of Leitz polarizing microscope at a magnification of 40× with the sample on a Leitz hot stage and under a nitrogen atmosphere. The polymer melt is optically anisotropic, i.e. it transmits light when examined between crossed polarizers. The amount of light transmitted typically increases when the sample is sheared (made to flow).

Starting compounds capable of forming liquid crystalline polymers suitable as the second LCP component of the blends of the invention are as follows:

(1) one or more of aromatic and alicyclic dicarboxylic acids, (2) one or more of aromatic, alicyclic, and aliphatic diols;

(3) one or more of aromatic hydroxycarboxylic acids;

4) one or more of aromatic thiocarboxylic acids;

(5) one or more of aromatic dithiols and aromatic thiophenols; and (6) one or more of aromatic hydroxyamines and aromatic diamines.

LCPs suitable for use as the second component of the blends of the present invention can be selected from the following combinations of the above enumerated compounds:

(I) a polyester comprising units derived from (1) and (2);

(II) a polyester comprising only units derived from (3);

(III) a polyester comprising units derived from (1), (2) and (3);

(IV) a polythioester comprising only units derived from 4);

(V) a polythioester comprising units derived from (1) and (5);

(VI) a polythioester comprising units derived from (1), 4) and (5);

(VII) a polyester amide comprising units derived from (1), (3) and (6); and (VIII) a polyesteramide comprising units derived from(1), (2), (3) and (6).

In addition to the above-mentioned combinations of the components, the polymers forming the anisotropic molten phase include also aromatic polyazomethines such as:
poly(nitrilo-2-methyl-1,4,-phenylenenitriloethylidine- 1,4-phenylenethylidine);
poly(nitrilo-2-methyl-1,4-phenylenenitrilomethylidine- 1,4-phenylene-methylidine); and
poly (nitrilo-2-chloro-1,4-phenylenenitrilomethylidine- 1,4-phenylene-methylidine).

Further, in addition to the above-mentioned combinations of the components, the polymers forming the anisotropic molten phase include polyester carbonates essentially comprising 4-hydroxybenzoyl, dihydroxyphenyl, dihydroxycarbonyl and terephthaloyl units.

Examples of the compounds suitable for preparing the above-mentioned polymers (I) to (VIII) include aromatic dicarboxylic acids such as:
terephthalic acid,
4,4'-diphenyldicarboxylic acid,
4,4'-triphenyldicarboxylic acid
2,6-naphthalenedicarboxylic acid
diphenyl ether-4,4'-dicarboxylic acid
diphenoxyethane-4,4'-dicarboxylic acid
dipenoxybutane-4,4'-dicarboxylic acid
diphenylethane-4,4'-dicarboxylic acid
isophthalic acid
diphenyl ether-3,3'-dicarboxylic acid
diphenoxyethane-3,3'-dicarboxylic acid
diphenylethane-3,3'-dicarboxylic acid, and
naphthalene-1,6-dicarboxylic acid;
and those substituted with alkyl and alkoxy groups and halogen atoms, such as:
chloroterephthalic acid
dichloroterephthalic acid
bromoterephthalic acid
methylterephthalic acid
dimethylterephthalic acid
ethylterephthalic acid
methoxyterephthalic acid
ethoxyterephthalic acid.

Examples of the alicyclic dicarboxylic acids include:
trans-1,4-cyclohexanedicarboxylic acid
cis-1,4-cyclohexanedicarboxylic acid, and
1,3-cyclohexanedicarboxylic acid,
as well as those substituted with alkyl and alkoxy groups and halogen atoms, such as:
trans-1,4-(1-methyl)cyclohexane dicarboxylic acid and
trans-1,4-(1-chloro)cyclohexanedicarboxylic acid.

Examples of the aromatic diols include:
hydroquinone
resorcinol
4,4'-dihydroxydiphenyl
4,4'-dihydroxytriphenyl
2,6-naphthalenediol
4,4'-dihydroxydiphenyl ether
bis-(4-hydroxyphenoxy)ethane
3,3'-dihydroxydiphenyl
3,3'-dihydroxydiphenyl ether
1,6-naphthalenediol
2,2'-bis(4-hydroxyphenyl)propane, and
2,2-bis(4-hydroxyphenyl)methane
styryl hydroquinone
t-butylhydroquinone
as well as those substituted with alkyl and alkoxy groups and halogen atoms, such as
chlorohydroquinone
methylhydroquinone
phenylhydroquinone
methoxyhydroquinone
1-butylhydroquinone
phenylhydroquinone
methoxyhydroquinone
phenoxyhydroquinone
4-chlororesorcinol, and
4-methylresorcinol.

Examples of the alicyclic diols include: trans-1,4-cyclohexanediol
cis-1,4-cyclohexanediol
trans-1,4-cyclohexanedimethanol
cis-1,4-cyclohexanedimethanol
trans-1,3-cyclohexanediol
cis-1,2-cyclohexanediol, and
trans-1,3-cyclohexanedimethanol
as well as those substituted with alkyl and alkoxy groups and halogen atoms, such as
trans-1,4-(1-methyl) cyclohexanediol and
trans-1,4-(1-chloro) cyclohexanediol.

Examples of the aliphatic diols include straight-chain or branched-chain aliphatic diols such as:
ethylene glycol
1,3-propanediol
1,4-butanediol, and
neopentyl glycol Examples of the aromatic hydroxycarboxylic acids include:
4-hydroxybenzoic acid
3-hydroxybenzoic acid
6-hydroxy-2-naphthoic acid
and 6-hydroxy-1-naphthoic acid
as well as those substituted with alkyl and alkoxy groups and halogen atoms, such as
3-methyl-4-hydroxybenzoic acid
3,5-dimethyl-4-hydroxybenzoic acid
2,6-dimethyl-4-hydroxybenzoic acid
3-methoxy-4-hydroxybenzoic acid
3,5-dimethoxy-4-hydroxybenzoic acid
6-hydroxy-5-methyl-2-naphthoic acid
6-hydroxy-5-methoxy-2-naphthoic acid
3-chloro-4-hydroxybenzoic acid
2-chloro-4-hydroxy-benzoic acid
2,3-dichloro-4-hydroxybenzoic acid
3,5-dichloro-4-hydroxybenzoic acid
2,5-dichloro-4-hydroxybenzoic acid
3-bromo-4-hydroxybenzoic acid
6-hydroxy-5-chloro-2-naphthoic acid
6-hydroxy-7-chloro-2-naphthoic acid, and
6-hydroxy-5,7-dichloro-2-naphthoic acid.

Examples of mercaptocarboxylic acids include:
4-mercaptobenzoic acid
3-mercaptobenzoic acid
6-mercapto-2-naphthoic acid, and
7-mercapto-2-naphthoic acid.

Examples of aromatic dithiols include:
benzene-1,4-dithiol, benzene-1,3-dithiol
2,6-naphthalenedithiol, and
2,7-naphthalenedithiol.

Examples of the aromatic mercaptophenols include;
4-mercaptophenol
3-mercaptophenol
6-mercaptophenol, and
7-mercaptophenol.

Examples of aromatic hydroxyamines and aromatic diamines include:
4-aminophenol
N-methyl-4-aminophenol
1,4-phenylenediamine
N-methyl-1,4-phenylenediamine
N,N'-dimethyl-1,4-phenylenediamine
3-aminophenol
3-methyl-4-aminophenol
2-chloro-4-aminophenol
4-amino-1-naphthol
4-amino-4'-hydroxydiphenyl
4-amino-4'-hydroxydiphenyl ether
4-amino-4'-hydroxyphenylmethane
4-amino-4'-hydroxydiphenyl sulfide
4,4'-diaminophenyl sulfide(thiodianiline)
4,4'-diminodiphenyl sulfone
2,5-diaminotoluene
4,4'-ethylenedianiline
4,4'-diaminodiphenoxyethane
4,4'-diaminodiphenylmethane (methylenedianiline), and
4,4'-diaminodiphenyl ether (oxydianiline).

The polymers (I) to (VIII) comprising the above-mentioned components may be divided into a group of those capable of forming the anisotropic molten phase and a group of those incapable of forming said phase according to the constituents, polymers composition, and sequence distribution. The polymers used in the present invention are limited to those of the former group.

Examples of suitable second component polymers include the following:

Polyesters comprising units derived from terephthalic acid, p-hydroxybenzoic acid and biphenol;

Polyesters comprising units derived from isophthalic acid, p-hydroxybenzoic acid and biphenol;

Polyesters comprising units derived from a mixture of isophthalic and terephthalic acids, p-hydroxybenzoic acid and biphenol;

Polyesters comprising repeating units derived from terephthalic acid, isophthalic acid, p-hydroxybenzoic acid and hydroquinone;

Polyesters comprising units derived from p-hydroxybenzoic acid and 6-hydroxy-2-naphthoic acid;

Polyesters comprising terephthalic acid, isophthalic acid, p-hydroxybenzoic acid, methyl hydroquinone, hydroquinone and biphenol;

Polyesters comprising units derived from terephthalic acid, phenylhydroquinone, and optionally p-hydroxybenzoic acid;

Polyesters comprising units derived from terephthalic acid, p-hydroxybenzoic acid, hydroquinone and bisphenol O;

Polyesters comprising units derived from terephthalic acid, phenyl hydroquinone and 1-phenylethyl hydroquinone;

Polyesters comprising isophthalic acid, p-hydroxybenzoic acid, 6-hydroxy-2-naphthoic acid and hydroquinone; and Polyesters comprising the repeating units:

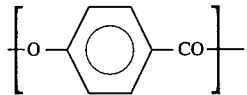

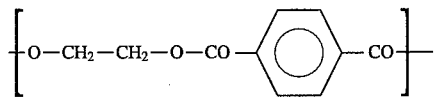

Preferably, the second component of the blends of the present invention comprises a liquid crystalline polyester, different from that of the first component, which is at least one member selected from the group of wholly aromatic polyesters consisting of:

(a) polyester resin consisting of (1) repeating units derived from at least one dicarboxylic acid selected from the group consisting of alicyclic dicarboxylic acids, and dicarboxylic acids comprising at least one non fused-ring aromatic moiety; and (2) repeating units derived from at least one diol selected from the group consisting of alicyclic diols, aliphatic diols, and diols comprising at least one non fused-ring aromatic moiety;

(b) polyester resin consisting of repeating units derived from one or more hydroxy-carboxylic acids comprising at least one non fused-ring aromatic moiety; and (c) polyester resin consisting of (1) repeating units derived from at least one dicarboxylic acid selected from the group consisting of alicyclic dicarboxylic acids, and dicarboxylic acids comprising at least one non fused-ring aromatic moiety; and (2) repeating units derived from at least one diol selected from the group consisting of allcyclic diols, aliphatic diols, and diols comprising at least one non fused-ring aromatic moiety; and (3) repeating units derived from one or more hydroxy-carboxylic compounds comprising at least one non fused-ring aromatic moiety;

Particularly preferred second component polyesters for use in the blends of the invention are copolyesters comprising the repeating units:

(6)

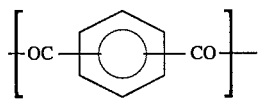

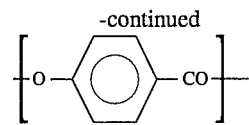

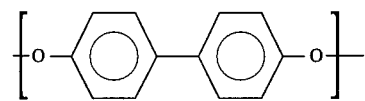

wherein the number of units (6) is approximately equal to the number of units (8). These polyesters are generally preferred as the second component because of their excellent high temperature properties and strength.

If end uses emphasize strength, further preferred copolyesters for use as the second component polyester of the blends of the invention are those in which units (6) is derived from terephthalic acid and isophthalic acid, and wherein the ratio of the number of terephthalic units to isophthalic units is about 1:1 to about 4:1 and wherein the ratio of the number of units (7) to the number of units (8) is about 1:1 to about 7:1, and preferably about 2:1 to about 4:1. FIG. 2 graphically approximates the compositional ranges for the preferred second component LCP derived from terephthalic acid, isophthalic acid, p-hydroxybenzoic acid and biphenol. With respect to the triangular diagram of the figure, it should be understood that the coordinates for each point within the bounded regions defines a copolyester in terms of molar percentages of p-oxybenzoyl units (top of triangle), biphenol-terephthaloyl units (lower left of triangle) and biphenol-isophthaloyl units (lower right of triangle). A given polyester can be assigned a point on the triangular diagram using the following conversions:

$$\% \ PHBA = \frac{(c)}{(a)+(b)+(c)} \times 100$$

$$\% \ Biphenol/TPA = \frac{(a)}{(a)+(b)+(c)} \times 100$$

$$\% \ Biphenol/IPA = \frac{(b)}{(a)+(b)+(c)} \times 100$$

where the terms "PHBA" "biphenol/TPA" and "biphenol/IPA" refer to the three compositional parameters of the triangular diagram of FIG. 2 and wherein (a) is moles of terephthaloyl units; (b) represents moles of isophthaloyl units; and (c) represents moles of oxybenzoyl units present in the polyester.

The inner bounded region of FIG. 2 illustrates a particularly preferred compositional range for the second component LCP.

Still further preferred copolyesters for use in the present invention are those in which unit (6) in the above formulas is terephthalic acid and the ratio of the number of units (6):(7):(8) is about 1:2–4:1. These polyesters are particularly preferred for use as the second blend component in those instances where molded articles prepared from the blends of the invention are intended for use under very high temperature conditions, such as infra-red soldering.

The above preferred second component polyesters comprising units (6), (7) and (8) can be manufactured in accordance with the procedures described above in connection with the discussion of the first component polyesters of the blends of the present invention.

The second component can also comprise liquid crytalline polymers comprising at least one recurring unit having the following general formula:

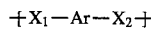

wherein —Ar— is selected from the group consisting of:

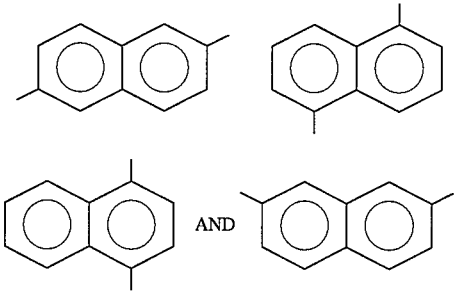

and wherein —$X_1$— and —$X_2$— are independently selected from the group consisting of —O— and —CO—.

Preferred naphthalene-containing copolyesters are those disclosed in U.S. Pat. Nos. 4,161,470; 4,184,996; and 4,256,624, herein incorporated by reference.

The polyester disclosed in U.S. Pat. No. 4,161,470 is a melt processible wholly aromatic polyester which is capable of forming an anisotropic melt phase at a temperature below approximately 350° C. The polyester comprises the recurring moieties (9) and (10), below, which may include substitution of at least some of the hydrogen atoms present upon an aromatic ring:

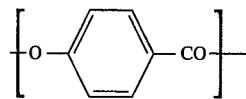 (9)

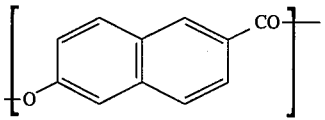 (10)

with said optional substitution if present being selected from the group consisting of any alkyl group of 1 to 4 carbon atoms, an alkoxy group of 1 to 4 carbon atoms, halogen, and mixtures of the foregoing. The wholly aromatic polyester there disclosed comprises approximately 10 to 90 mole percent of moiety (9) and approximately 90 to 10 mole percent of moiety (10).

The polyester disclosed in U.S. Pat. No. 4,184,996 is a melt processible wholly aromatic polyester which is capable of forming an anisotropic melt phase at a temperature below approximately 325° C. The polyester comprises the recurring moieties (11), (12), and (13):

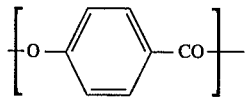 (11)

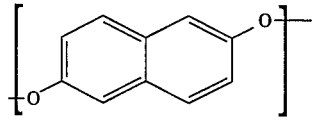 (12)

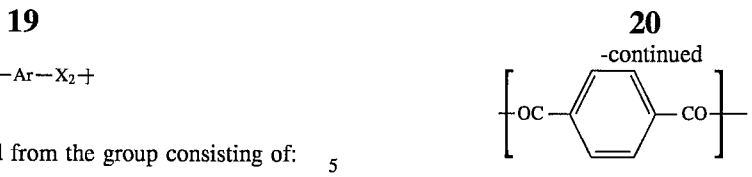 (13)

The wholly aromatic polyester there disclosed comprises approximately 30 to 70 mole percent of moiety (11). The polyester preferably comprises approximately 40 to 69 mole percent of moiety (11); approximately 20 to 30 mole percent of moiety (12); and approximately 20 to 30 mole percent of moiety (13). Each of the moieties of the polyester is free of ring substitution.

The polyester disclosed in U.S. Pat. No. 4,256,624 is a melt processible wholly aromatic polyester capable of forming an anisotropic melt phase at a temperature below approximately 400° C. The polyester comprises the recurring moieties (14), (15), and (16) which may include substitution of at least some of the hydrogen atoms present upon an aromatic ring:

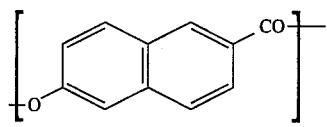 (14)

$$+O-Ar_1-O+ \quad (15)$$

$$+CO-Ar_1-CO+ \quad (16)$$

wherein $Ar_1$ is as previously defined; with said optional substitution, if present, being selected from the group consisting of an alkyl group of 1 to 4 carbon atoms, an alkoxy group of 1 to 4 carbon atoms, halogen, a phenyl group, and mixtures of the foregoing. The polyester comprises approximately 10 to 90 mole percent of moiety (14), approximately 5 to 45 mole percent of moiety (15), and approximately 5 to 45 mole percent of moiety (16).

As mentioned earlier the present invention includes the discovery that the above described blends can be enhanced with respect to toughness by the incorporation of from about 1 to about 50 wt. % polyetherimide, based on the weight of the resinous portion of the blends of the present invention. At levels of polyetherimide in excess of about 20 weight percent of the blend, it may be necessary to use a high temperature polyetherimide such as that described in Peters et al. U.S. Pat. No. 4,965,337 in order to obtain a molded article capable of withstanding soldering conditions. However, we have found that significant improvements in ductility can be achieved at levels of polyetherimide as low as about 10 weight percent. At such levels, the polyetherimide Ultem® 1000, sold commercially by General Electric, provides satisfactory heat resistance. This polyetherimide has the general formula:

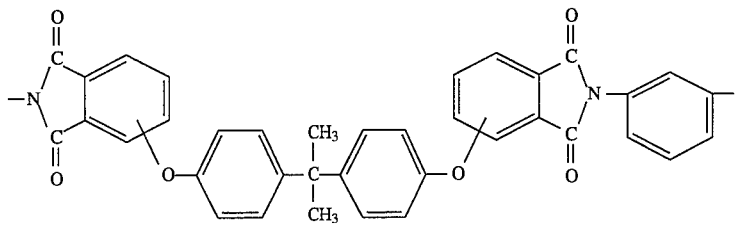

Polyether imides can be prepared by methods well known in the art as set forth in, for example, U.S. Pat. Nos. 3,833,544; 3,887,588; 3,991,004; 3,965,125; 4,017,511; and 4,024,110 which are incorporated by reference.

In the LCP blends of the present invention, weld line improvements can be obtained when the relative proportions of the first component to the second component range from about 1:100 to 100:1. In the preferred blends of the invention, in which the second component polyester is a copolyester based on isophthalic acid, terephthalic acid, p-hydroxybenzoic acid and biphenol within the outer bounded compositional region of FIG. 2, overall strength and high temperature properties are enhanced as one increases the amount of the second component relative to the first. Preferably, to provide an excellent balance of overall high temperature properties and strength, toughness, weld-line integrity, and resistance to warpage, the relative proportions of the first component to the second component should be in the range of about 1:9 to about 1:1, and most preferably about 1:9 to about 1:2. On the other hand, for molded articles in which concerns over warpage may outweigh the need to maximize toughness, an equal or greater amount of the first component over the second component is preferred, i.e. in a weight ratio of about 1:1 to about 9:1, and most preferably about 2:1 to about 9:1. We have found that blends in the above preferred proportions can afford molded parts for a wide variety of applications in the electrical industry which have an excellent balance of overall strength, weld-line strength and warpage reduction.

Apart from the novel and nonobvious composition of the blends of the present invention, the actual preparation of the blends may be accomplished using conventional compounding techniques which are well known to those skilled in the art. By way of illustration, the component LCPs, commonly in the form of chips, pellets or powders, can be weighed separately and then physically mixed together in any appropriate apparatus, e.g., a tumble blender. The physical mixture can then be dried if desired, preferably under vacuum or in a circulating air oven although any other suitable apparatus can be used. The purpose of the drying step is to remove water from the physical mixture so as to prevent degradation during processing. After the mixture of the solid polymer particles has been dried, the blend can be prepared. A convenient method of forming the blend is melt extrusion. The extrusion apparatus thoroughly mixes the polymers in the melt and then extrudes the blend in the form of a strand which, upon solidification, can be broken up into chips or pellets.

III. Molded Articles

The instant blends can be melt processed in the substantial absence of polymer degradation to form a variety of relatively stiff, shaped articles, e.g. molded three-dimensional articles, fibers, films, tapes, etc. The blends are suitable for molding applications and may be molded using standard injection molding techniques well known in the art for fabricating molded articles. Moreover, the blends of the invention display remarkably good flow properties characterized by very low viscosities at the injection molding temperature.

Molded articles in accordance with the present invention, such as thin-walled electrical connectors, can be molded from neat LCP blends, or from filled molding compounds which include, as the resin component, the LCP blends described for use in the present invention. Such a molding compound can incorporate into the blends from about 1 to about 70 percent, preferably from about 20 to about 50 percent, by weight, based upon the total weight of the molding compound, of a solid filler and/or reinforcing agent. Representative fibers which may serve as reinforcing media include glass fibers, asbestos, graphitic carbon fibers, amorphous carbon fibers, synthetic polymeric fibers, aluminum fibers, aluminum silicate fibers, oxide or aluminum fibers, titanium fibers, magnesium fibers, rock wool fibers, steel fibers, tungsten fibers, cotton, wool, and wood cellulose fibers, etc. Representative filler materials include glass beads, calcium silicate, silica, clays, talc, mica, polytetrafluoroethylene, carbon black, graphite, alumina trihydrate, sodium aluminum carbonate, barium ferrite, wollastonite, titanium dioxide, etc. These molding compounds are useful in a variety of applications, for example, in cookware articles, electrical components, and the like.

The compounding of the blends used in the present invention can be carried out using conventional melt extrusion. The solid fillers and reinforcing agents described above may be incorporated into already formed neat LCP blends, or the individual blend components may be compounded with appropriate levels of filler prior to the formation of the blends.

While base resin composition is the principal factor affecting molded part warpage and weld line strength, we have made the further surprising discovery that an additional and significant improvement in weld line strength is afforded by the incorporation of non-particulate filler into the LCP blends used in the present invention. The term "non-particulate filler" is intended to mean fillers having an aspect ratio, after compounding of not less than about 7. The term "after compounding" refers to the glass fiber after the fiber has been subjected to the normal attrition in length associated with resin compounding. This is to be distinguished from the as-received fiber prior to compounding. A preferred non-particulate filler for use in the present invention is sized long chopped glass having a having an aspect ratio, after compounding, of about 7 to about 100, and preferably about 10 to 30. The term "long glass" is intended to mean glass fibers having an as-supplied number average length of about 1/16 inch to about 1/4 inch. A particularly preferred long glass used in the present invention is 1/8" fiber glass commercially obtained from Owens-Corning under the trade designations "OC 497EE" and "OC 497DB". Our finding with respect to non-particulate filler is surprising in that a particulate filler, such as milled glass having an aspect ratio of about 4 to about 7 does not appear to afford a similar additional weld line improvement beyond that which the blend itself provides. While not intending to be bound to any particular theory of operation for the present invention, it is believed that the lower crystallization rates afforded in the blends of the present invention permit the chopped glass fibers to intermingle or cross-mingle at the boundary region of the weld fronts. Such intermingling has been indicated in microscopic examinations of broken weld lines of the blends of the invention. Such examination suggests that the fiberglass strands are cross-mingling from one flow front to another, whereas examination of weld line breaks in the single component LCP does not indicate any intermingling of the glass fiber across the resin flow fronts. If such cross-mingling is, in fact, the operative phenomenon leading to improvements in weld strength, it is postulated that particulate filler may not have the ability to intermingle across the flow fronts in this fashion due to the low aspect ratio of particulate materials. It is also possible that the sizing material added to the commercial glass fiber is contributing to improvement of properties in the blends.

We have discovered that LCP blends satisfying certain crystallization criteria have the ability to improve weld line strength and warpage in molded articles, as compared to articles fabricated from a single LCP. This finding is particularly important for thin-walled molded articles of the type which have a tendency to warp after molding, and which must be assembled under conditions having a tendency to cause breakage of the article at the weld lines. Accordingly, the present invention is directed to molded articles having improved resistance to weld line breakage, fabricated from a polymer blend comprising at least one liquid crystalline polymer and at least one additional polymer, wherein the blend has a crystallization rate lower than the liquid crystalline polymer. The additional polymer is preferably a liquid crystalline polymer. The molded articles of the present invention encompass thin-walled electrical connectors comprising at least one structural portion having thickness not greater than about 0.030 inches. Preferably, to achieve the greatest enhancements in weld strength, the crystallization temperature and the crystallization rate of the blend should be lower than that of the individual liquid crystalline polymers constituting the blend. For purposes of the present invention the term weld line should be understood to denote the various regions in the molded article where separate resin flows have joined, even if such regions are not readily noticeable upon visual inspection.

Based on the improvements in weld line strength which can be obtained in articles injection molded in molds having multiple gates, or in molds designed such that separate resin flow fronts join at one or more points during molding, the present invention is further directed to an injection molding process for obtaining molded articles having improved weld line strength, said process comprising the step of injecting into a mold a molten polymeric blend composition comprising at least one liquid crystalline polymer and at least one additional polymer, wherein the composition has a crystallization rate lower than said at least one liquid crystalline polymer, and wherein said molten polymeric composition, after injection, comprises separate flow fronts which merge into one another to form the molded article.

Although any compatible combination of liquid crystalline polymers meeting the crystallization criteria given above may be used to prepare the molded articles according to the invention, preferred LCP blends for use in manufacturing the molded articles are the blends having a first and second component as described above.

Particularly preferred articles covered by the present invention are molded thin-walled electrical connectors fabricated from an LCP blend according to the present invention in which the first component is a five-component LCP having the composition as approximated by the lower bounded region in FIG. 1, and wherein the second component polyester is a polyester based on isophthalic acid, terephthalic acid, p-hydroxybenzoic acid and biphenol having a composition as approximated by the bounded region of FIG. 2. Also preferred as the second component are the polyesters identified as Vectra® E-950 and E-130 which are commercially sold by Hoechst-Celanese Corporation.

It should also be pointed out that the molded articles in accordance with the present invention can be fabricated using LCP blends other than as described in the present invention. Hence, LCP blends suitable for the molded articles hereof include those which comprise a polyester comprising the following repeating units (17), (18), (19) and (20):

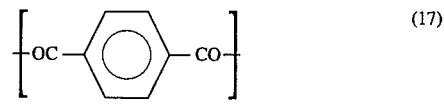

(17)

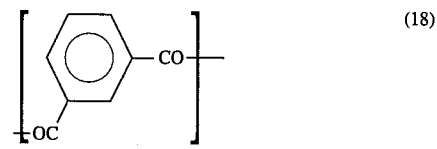

(18)

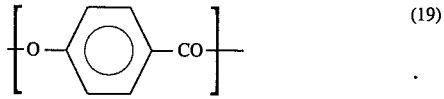

(19)

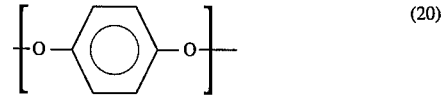

(20)

wherein the sum total of the number of units (17) and (18) is approximately equal to the total number of units (20). LCPs of the type depicted are described in commonly assigned Layton et al U.S. Ser. No. 412,722 (allowed); commonly assigned Layton et al U.S. Ser. No. 499,482 (allowed); and commonly assigned Layton et al U.S. Ser. No. 499,483 (allowed). The latter two applications correspond to published PCT Application Nos. WO 90/0400 and 04003, respectively. These disclosures are hereby incorporated by reference.

IV. Analytical Techniques

X-ray Measurements

Apparatus X-ray diffraction data were obtained using a Philips XRG-3000 X-ray generator equipped with a vertical diffractometer, a long, fine focus copper X-ray tube, a Paar HTK-10 high-temperature diffractometer attachment and a Paar HTK-Heat Controller. Diffractometer position is controlled by computer, which also measures and records radiation count rate produced by sample crystallinity and sample temperature.

Determination of the Polymer Melting Point

A sample of the polymer is submitted to a preliminary X-ray diffraction scan between 15 and 25 degrees two-theta angle by increasing the temperature by increments of 60° C. within a temperature range from about 200° to about 480° C. This allows determination of the approximate temperature at which the peak located at approximately 19.7 degrees two-theta (4.50 Angstroms d-spacing) reaches its minimum value, i.e. an approximate melting point. A second-degree polynomial equation is derived from the above data; this polynomial equation now allows one to follow the peak angle as the sample temperature is varied. The temperature at which the peak height reaches a minimum (i.e. touches the baseline) is considered to be the melting point. The polymer sample is now heated and cooled at a rate of 100° C. per minute between the previously-mentioned temperature limits, and its melting point is determined. Since the melting point of a crystalline material often changes on heating and cooling (due to recrystallization, further polymerization, etc.) the sample is cooled and reheated. This allows determination of the melting point on the second heating cycle. Generally, the second cycle yields a melting point which remains approximately constant if additional heating or cooling cycles are performed. Therefore, the value obtained in the second heating cycle is taken as the polymer melting point.

Crystallization Temperature (Onset of Crystallization)

The onset of crystallization is measured in the same manner except that the scanning (as described above), is performed while the sample is cooled at 100° C. per minute. The temperature at which the peak emerges from the baseline during the second cooling cycle is considered as the onset of crystallization.

Crystallization Rate

At every temperature below the sample melting point, the intensity of X-ray diffraction of a crystalline material can be expressed as counts per second (or any unit of time). The increase in the number of counts per unit of time while the sample is being cooled at a certain rate (100° C. per minute) is therefore proportional to the rate of crystallization. A temperature interval starting at the onset of crystallization and 40° C. below that temperature was arbitrarily chosen. Rates of crystallization are expressed as the increase in counts per minute for a sample cooled within these temperature limits during the second cooling cycle.

Miscellaneous

The flexural strength and the flexural modulus of the experimental samples were measured according to the procedure of ASTM D-790-84A; HDT (DTUL) data were obtained using the method described in ASTM D-648-82.

The examples given below are intended for illustration only and are not to be construed as limiting the invention as defined in the appended claims.

EXAMPLES OF BLEND COMPONENTS

EXAMPLES 1-34

Examples 1 to 29 illustrate LCP polymers which can serve as the first component in the blends of the present invention. Examples 30-34 illustrate polyesters which can be used as a second blend component in accordance with the present invention. It should be understood that the polyesters described in Examples 1-34 may be used as an LCP component in LCP blends used to manufacture thin-walled articles in accordance with the present invention.

EXAMPLE 1

This example describes the synthesis of a liquid crytalline polyester based on terephthalic acid (TA), isophthalic acid (IA), p-hydroxybenzoic acid (PHBA), hydroquinone (HQ) and 4,4'-biphenol (BP) in the nominal mole ratio of 0.615/0.385/0.750/0.9/0.1.

The following ingredients and amounts were used:

| Item | Ingredient | Amount (kg) |
| --- | --- | --- |
| A | Terephthalic Acid | 4.838 |
| B | Isophthalic Acid | 3.029 |
| C | p-Hydroxybenzoic acid | 4.905 |
| D | Hydroquinone | 4.693 |
| E | 4,4'-Biphenol | 0.882 |
| F | Acetic anhydride | 15.295 |
| G | Magnesium acetate tetrahydrate | 7.056(gm) |

Items A through G were charged to a 15 gallon, oil-heated vessel equipped with an anchor-type stirrer, reflux condenser, after condenser and distillate receiver.

After purging with nitrogen, the contents were heated with stirring to 141° C. and held under reflux at that temperature for 3 hours. Distillation was then started while increasing the temperature over a 6 to 7 hour period to 275° C. The contents of the vessel were transferred to a sigma blade mixer that had been preheated to 305° C. After mixing for 5 hours at this temperature under an atmosphere of nitrogen, the mixer was cooled to near room temperature at which point the polymer was removed as a granular solid. The yield was 15.2 kg (95 percent of theoretical). Examination by X-ray diffraction showed a melting temperature of 369° C., crystallization temperature of 314° C. and a crystallization rate of 560 counts per minute.

A sample of the polymer was pelletized and molded by standard techniques. The test specimens had a heat distortion temperature of 268° C. at 264 psi and a room temperature flexural strength of 28,000 psi and room temperature flexural modulus of 2,460,000 psi.

A molding composition containing 70 weight percent of the above polymer and 30 weight percent of milled glass fiber was prepared by compounding on a twin screw extruder and molded into test specimens. The heat distortion temperature (ASTM D-648) was 265° C. The room temperature flexural strength and modulus (psi) were 27,200 and 2,240,000 respectively.

EXAMPLES 2-15

LCP polyesters suitable for use as the first component of the blends of the present invention were prepared from the same ingredients A through G of Example 1 but in the proportions given in the following examples:

| | Example 2 | | | Example 3 | | |
| --- | --- | --- | --- | --- | --- | --- |
| Ingredient | moles | wt. (kg) | Ingredient | moles | wt. (kg) |
| A | 0.585 | 4.654 | A | 0.850 | 6.468 |
| B | 0.415 | 3.302 | B | 0.150 | 1.141 |
| C | 0.750 | 4.961 | C | 0.750 | 4.745 |
| D | 0.950 | 5.010 | D | 0.750 | 3.783 |
| E | 0.050 | 0.446 | E | 0.250 | 2.132 |
| F | — | 15.468 | F | — | 14.787 |
| G | — | 0.007 | G | — | 0.007 |
| ratio of hydroquinone to biphenol: 19:1 | | | ratio of hydroquinone to biphenol: 3:1 | | |
| Example 4 | | | Example 5 | | |
| A | 0.585 | 2.573 | A | 0.850 | 3.647 |
| B | 0.415 | 1.825 | B | 0.150 | 0.644 |
| C | 3.000 | 10.971 | C | 3.000 | 10.701 |
| D | 3.783 | 2.769 | D | 0.750 | 2.133 |
| E | 0.250 | 0.246 | E | 0.250 | 1.202 |
| F | — | 15.540 | F | — | 15.159 |
| G | — | 0.007 | G | — | 0.007 |

-continued

| ratio of hydroquinone to biphenol: 19:1 Example 6 | | | ratio of hydroquinone to biphenol: 3:1 Example 7 | | |
|---|---|---|---|---|---|
| A | 0.5 | 4.510 | A | 0.5 | 4.341 |
| B | 0.5 | 4.510 | B | 0.5 | 4.341 |
| C | 0.4285 | 3.213 | C | 0.54 | 3.897 |
| D | 0.96 | 5.739 | D | 0.985 | 5.667 |
| E | 0.04 | 0.404 | E | 0.015 | 0.146 |
| F | — | 15.481 | F | — | 15.583 |
| G | — | 0.007 | G | — | 0.007 |
| ratio of hydrocruinone to biphenol: 24:1 Example 8 | | | ratio of hydroquinone to biphenol: 65.6:1 Example 9 | | |
| A | 0.54 | 4.6477 | A | 0.54 | 4.6765 |
| B | 0.46 | 3.9591 | B | 0.46 | 3.9837 |
| C | 0.54 | 3.8641 | C | 0.54 | 3.8880 |
| D | 0.95 | 5.4193 | D | 0.975 | 5.5964 |
| E | 0.05 | 0.482 | E | 0.025 | 0.243 |
| F | — | 15.449 | F | — | 15.545 |
| G | — | 0.007 | G | — | 0.007 |
| ratio of hydroquinone to biphenol: 19:1 Example 10 | | | ratio of hydroquinone to biphenol: 39:1 Example 11 | | |
| A | 0.55 | 4.459 | A | 0.6075 | 205.9 |
| B | 0.45 | 3.722 | B | 0.3925 | 133.0 |
| C | 0.6 | 4.126 | C | 0.6250 | 176.1 |
| D | 0.9 | 5.044 | D | 0.9500 | 213.4 |
| E | 0.1 | 0.927 | E | 0.05 | 19.0 |
| F | — | 15.433 | F | — | 587.5 |
| G | — | 0.007 | G | — | 0.2682 |
| ratio of hydroquinone to biphenol: 9:1 Example 12 | | | ratio of hydroquinone to biphenol: 19:1 Example 13 | | |
| A | 0.6150 | 196.1 | A | 0.6225 | 187.3 |
| B | 0.3850 | 122.7 | B | 0.3775 | 113.6 |
| C | 0.7500 | 198.8 | C | 0.8750 | 218.9 |
| D | 0.9000 | 190.2 | D | 0.8500 | 169.5 |
| E | 0.1000 | 35.7 | E | 0.1500 | 50.6 |
| F | — | 581.2 | F | — | 575.6 |
| G | — | 0.2682 | G | — | 0.2682 |
| ratio of hydroquinone to biphenol: 9:1 Example 14 | | | ratio of hydroquinone to biphenol: 5.6:1 Example 15 | | |
| A | 0.6300 | 179.5 | A | 0.6375 | 165.9 |
| B | 0.3700 | 105.4 | B | 0.3625 | 94.3 |
| C | 1.0000 | 236.9 | C | 1.1250 | 243.4 |
| D | 0.8000 | 151.1 | D | 0.7500 | 129.4 |
| E | 0.2000 | 63.9 | E | 0.2500 | 72.9 |
| F | — | 570.5 | F | — | 565.9 |
| G | — | 0.2682 | G | — | 0.2682 |
| ratio of hydroquinone to biphenol: 4:1 | | | ratio of hydroquinone to biphenol: 3:1 | | |

Of the Examples 2–15 summarized in the above table, polyesters corresponding to Examples 2–10 were prepared using the procedure described in Example 1. Polyesters corresponding to Examples 11–15 were prepared in the following manner: The ingredients in amounts as shown in the table were charged to a 2 liter resin kettle fitted with a heating mantle, mechanical stirrer, reflux condenser, and distillate take-off apparatus. The mixture was heated to reflux and stirred for 3 hours. Distillation was then started and the temperature of the reaction mixture increased at the rate of 30° C. per hour until approximately 97 percent of the theoretical distillate was collected. The hot mixture was then poured into an aluminum pan to cool to a brittle sheet. The material was then pulverized to a granular powder fine enough to pass a 2 mm screen. The powder was heated up slowly (22° C. per hour) under nitrogen to 300° C. and held for 4 hours at that temperature.

The polymer properties of the LCP polyesters corresponding to Examples 2, and 4–9 are shown in the following Table:

| | POLYMER PROPERTIES OF EXAMPLES 2 and 4-9 | | | | | |
|---|---|---|---|---|---|---|
| | Flexural | | Tensile | | | |
| Ex. No | Strength (psi) | Modulus (psi × $10^6$) | Strength (psi) | Modulus (psi × $10^6$) | Elongation (%) | HDT 264 psi °C. |
| 2 | | | | | | |
| Neat | 12,180 | 1.14 | 6,210 | 1.51 | 0.4 | 220 |
| 30% glass filled | 14,750 | 1.61 | 8,890 | 1.86 | 0.6 | 227 |
| 4 | | | | | | |
| Neat | 10,870 | 1.67 | — | — | — | 210 |
| 30% glass filled | 9,770 | 1.43 | — | — | — | 225 |
| 5 | | | | | | |
| Neat | 11,600 | 1.37 | — | — | — | 283 |
| 30% glass filled | 9,660 | 1.17 | — | — | — | 262 |
| 6 | | | | | | |
| Neat | 26,240 | 2.0 | 19,300 | 3.14 | 0.7 | 227 |
| 30% glass filled | 22,990 | 2.0 | 17,750 | 2.77 | 1.1 | 250 |
| 7 | | | | | | |
| Neat | 17,670 | 1.43 | — | — | — | 251 |
| 30% glass filled | 20,160 | 1.91 | — | — | — | 231 |
| 8 | | | | | | |
| Neat | 24,330 | 1.97 | 20,520 | 2.7 | 0.9 | 244 |
| 30% glass filled | 22,020 | 2.08 | 14,560 | 2.8 | 0.8 | 256 |
| 9 | | | | | | |
| Neat | 24,502 | 2.24 | 14,670 | 2.26 | 0.84 | 246 |
| 30% glass filled | 20,980 | 2.20 | 15,960 | 2.45 | 1.0 | 255 |

EXAMPLE 16

The synthesis of Example 1 is repeated except that the ingredient amounts are used to obtain a five component polyester wherein units derived from terephthalic acid, isophthalic acid, p-hydroxybenzoic acid, hydroquinone, and 4,4'-biphenol are present in the nominal mole ratio of about .7/.3/1.5/.5/.5, respectively. This polyester is suitable for use as the first component in the blends of the present invention.

EXAMPLES 17–25

For Examples 17–25, the synthesis of Example 1 is repeated except that the ingredient amounts for terephthalic acid, isophthalic acid, p-hydroxybenzoic acid, hydroquinone, and 4,4'-biphenol are as shown below. The amounts of acetic anhydride, magnesium acetate tetrahydrate and triphenyl phosphite are adjusted accordingly. The polyesters of these examples 17–25 are intended for use as the first component in the blends of the present invention. A synthesis of the five-component LCPs represented by examples 17–23, below, can also be found in Dicke U.S. Pat. No. 4,603,190 (Examples 9–14 and 17) which is incorporated by reference herein. A synthesis of the LCPs represented by Examples 24 and 25 can be found in Portugall et al U.S. Pat. No. 4,751,128 (Examples 1 and 2 thereof).

| Ingredient | Amount (g) |
|---|---|
| *Example 17* | |
| Terephthalic acid | 33.87 |
| Isophthalic acid | 199.36 |
| p-hydroxybenzoic acid | 331.49 |
| Hydroquinone | 132.13 |
| Biphenol | 44.64 |
| *Example 18* | |
| Terephthalic acid | 399 |
| Isophthalic acid | 2392 |
| p-hydroxybenzoic acid | 4309 |
| Hydroquinone | 1586 |
| Biphenol | 447 |
| *Example 19* | |
| Terephthalic acid | 34.4 |
| Isophthalic acid | 206.4 |
| p-hydroxybenzoic acid | 374.4 |
| Hydroquinone | 139.2 |
| Biphenol | 39.6 |
| *Example 20* | |
| Terephthalic acid | 34.4 |
| Isophthalic acid | 189.2 |
| p-hydroxybenzoic acid | 403.2 |
| Hydroquinone | 127.6 |
| Biphenol | 39.6 |
| *Example 21* | |
| Terephthalic acid | 34.4 |
| Isophthalic acid | 182.32 |
| p-hydroxybenzoic acid | 423.4 |
| Hydroquinone | 121.8 |
| Biphenol | 41.58 |
| *Example 22* | |
| Terephthalic acid | 51.6 |
| Isophthalic acid | 165.1 |
| P-hydroxybenzoic acid | 423.4 |
| Hydroquinone | 121.8 |
| Biphenol | 41.58 |
| *Example 23* | |
| Terephthalic acid | 51.6 |
| Isophthalic acid | 172 |
| P-hydroxybenzoic acid | 403.2 |
| Hydroquinone | 127.6 |
| Biphenol | 39.6 |
| *Example 24* | |
| Terephthalic acid | 412.8 |
| Isophthalic acid | 103.2 |
| P-hydroxybenzoic acid | 648 |
| Hydroquinone | 208.8 |
| Biphenol | 237.6 |
| *Example 25* | |
| Terephthalic acid | 361.2 |
| Isophthalic acid | 154.8 |
| p-hydroxybenzoic acid | 648 |
| Hydroquinone | 174 |
| Biphenol | 297 |

EXAMPLES 26–29

Examples 26–29 illustrate LCP polymers (i.e., based on recurring units derived from isophthalic acid, terephthalic, p-hydroxybenzoic acid and hydroquinone) which can be used in the present invention.

EXAMPLE 26

This is an example of the synthesis of a polyester based on terephthalic acid, isophthalic acid, p-hydroxybenzoic acid, and hydroquinone in the nominal mole ratio of 0.6:0.4:0.5:1. The following ingredients were combined in the manner described.

| Item | Ingredient | Amount | |
|---|---|---|---|
| A | Terephthalic acid | 5.311 | kg |
| B | Isophthalic acid | 3.541 | kg |
| C | p-Hydroxybenzoic acid | 3.680 | kg |
| D | Hydroquinone | 5.868 | kg |
| E | Acetic acid | 15.645 | kg |
| F | Magnesium acetate tetrahydrate | 0.46 | g |
| G | Triphenyl phosphite | 7.36 | g |

Items A through F were charged to a 15-gallon, oil heated vessel equipped with an anchor type stirrer, reflux condenser, after condenser, injection port, and distillate receiver. After purging with nitrogen, the contents were heated with stirring to 141° C. while increasing the temperature over a 4.8 hour period to 285° C. Item G was then injected into the vessel. After an additional 15 minutes the contents of the vessel were transferred to a sigma blade mixer that had been preheated to 320° C. After mixing for 4 hours at this temperature under an atmosphere of nitrogen, the mixer was cooled to near room temperature where the contents were removed as a granular solid.

EXAMPLE 27

This is an example of the synthesis of a polyester based on terephthalic acid, isophthalic acid, p-hydroxybenzoic acid and hydroquinone in the nominal mole ratio of 0.6:0.4:0.75:1. The following ingredients were combined in the manner described:

| Item | Ingredient | Amount | |
|---|---|---|---|
| A | Terephthalic acid | 4.829 | kg |
| B | Isophthalic acid | 3.219 | kg |
| C | p-Hydroxybenzoic acid | 5.018 | kg |
| D | Hydroquinone | 5.334 | kg |
| E | Acetic anhydride | 15.645 | kg |
| F | Magnesium acetate tetrahydrate | 0.46 | g |
| G | Triphenyl phosphite | 7.36 | g |

These ingredients were processed as described in Example 26.

EXAMPLE 28

This is an example of the synthesis of a polyester based on terephthalic acid, isophthalic acid, p-hydroxybenzoic acid and hydroquinone in the nominal mole ratio of 0.41/0.59/0.43/1.015. The following ingredients were combined in the manner described:

| Item | Ingredient | Amount | |
|---|---|---|---|
| A | Terephthalic acid | 3.761 | kg |
| B | Isophthalic acid | 5.319 | kg |
| C | p-Hydroxybenzoic acid | 3.235 | kg |
| D | Hydroquinone | 6.108 | kg |
| E | Acetic anhydride | 15.776 | kg |
| F | Magnesium acetate tetrahydrate | 7.06 | g |
| G | Triphenyl phosphite | 16.00 | g |

Items A through F were charged to a 15-gallon, oil heated vessel equipped with an anchor type stirrer, reflux condenser, after condenser, injection port and distillate receiver. After purging with nitrogen, the contents were heated with stirring to 141° C. and held under reflux at that temperature for 3 hours. Distillation was then started while increasing the temperature 20° C. per hour to 259° C. Item G was then injected into the vessel. After the reactor reached 263° C. the contents of the vessel were transferred to a sigma blade mixer that had been preheated to 300° C. After mixing for 5 hours at this temperature under an atmosphere of nitrogen, the mixer was cooled to near room temperature where the contents were removed as a granular solid.

EXAMPLE 29

This example describes the preparation of a polyester based on terephthalic acid, isophthalic acid, p-hydroxybenzoic acid and hydroquinone having the mole ratio of 0.5/ 0.5/1.0/1.015. The following ingredients were combined in the manner described:

| Item | Ingredient | Amount | |
|------|------------|--------|---|
| A | Terephthalic acid | 3.678 | kg |
| B | Isophthalic acid | 3.678 | kg |
| C | p-Hydroxybenzoic acid | 6.115 | kg |
| D | Hydroquinone | 4.948 | kg |
| E | Acetic anhydride | 15.782 | kg |
| F | Magnesium acetate tetrahydrate | 7.06 | g |
| G | Triphenyl phosphite | 16.00 | g |

Items A through F were charged to a 15-gallon, oil heated vessel equipped with an anchor type stirrer, reflux condenser, after condenser, injection port and distillate receiver. After purging with nitrogen, the contents were heated with stirring to 141° C. and held under reflux at that temperature for 3 hours. Distillation was then started while increasing the temperature 30° C. per hour to 273° C. Item G was then injected into the vessel. After the reactor reached 277° C. the contents of the vessel were transferred to a sigma blade mixer that had been preheated to 285° C. After mixing for 5 hours at this temperature under an atmosphere of nitrogen, the mixer was cooled to near room temperature where the contents were removed as a granular solid.

EXAMPLES 30–34

The Second Blend Component

The following examples 30–34 are provided to illustrate LCP polymers which can be used as the second component of the LCP blends described for use in the blends of the present invention.

EXAMPLE 30

This example illustrates preparation of polyester having the following molar composition: 0.25 moles isophthalic acid/0.75 moles terephthalic acid/3.0 moles p-hydroxybenzoic acid/1.0 mole 4,4'-biphenol. A mixture of:
184 lbs of terephthalic acid;
61 lbs of isophthalic acid;
612 lbs of low ash p-hydroxybenzoic acid;
275 lbs of 4,4'-biphenol;
868 lbs of acetic anhydride; and
40.1 grams (88.5 ppm) of magnesium acetate tetrahydrate
was placed in a 325 gallon reactor and heated with stirring until distillation started. The reactor was held at this temperature for 3 hours. Distillation was started and the temperature increased until 400 pounds of distillate had been collected. The contents were pressured into a 200 gallon reactor and the temperature was increased at a rate of 30° C. per hour until the contents reached 313° C. Then the contents were poured into a mechanical mixer and mixed at 290° to 300° C. for 5 hours.

EXAMPLE 31

This example illustrates preparation of polyester having the following molar composition: 1 mole terephthalic acid/ 3.7 moles p-hydroxybenzoic acid/1 mole 4,4'-biphenol.

The following ingredients were combined in the manner described:

| Item | Ingredient | Amount | |
|------|------------|--------|---|
| A | Terephthalic acid | 1.638 | kg |
| B | p-Hydroxybenzoic acid | 5.039 | kg |
| C | 4,4'-Biphenol | 1.837 | kg |
| D | Acetic anhydride | 6.600 | kg |
| E | Potassium sulfate | 0.5 | g |
| F | Pentaerythritol diphosphite | 6.6 | g |

Items A through E were charged into the reactor and heated to 307° C. over a period of 10 hours with distillation of acetic acid item F was then added and heating was continued for 6 minutes to a melt temperature of 310° C. The contents of the vessel were transferred to a sigma blade mixer that had been preheated to 335° C. for 9.5 hours under an atmosphere of nitrogen. The mixer was cooled to near room temperature where the contents were removed as a granular solid.

EXAMPLE 32

The same procedure described above in Example 31 was used to prepare an LCP based on repeating units derived from terephthalic acid, p-hydroxybenzoic acid, and biphenol in a mole ratio of about 1:2:1.

EXAMPLE 33

The LCP of this example, suitable for use as the second blend component in the blends used in the present invention is the naphthalene-based LCP commercially available under the tradename Vectra® A-950 from the Hoechst-Celanese Corporation. This LCP is composed of about 70 mole percent oxybenzoyl moieties (1) and about 30 mole percent 6-oxy-2-naphthoyl moieties (2):

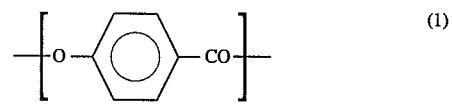

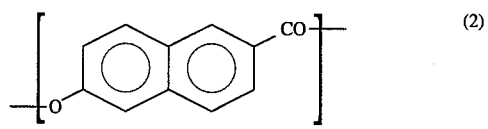

The manufacture of this LCP is described in Calundann U.S. Pat. No. 4,160,470 the disclosure of which is incorporated herein by reference.

EXAMPLE 34

The LCP of this example, suitable for use as the second blend component in the blends used in the present invention is the naphthalene-based LCP commercially available under the tradename Vectra® E-950 from Hoechst Celanese Corporation. This LCP is believed to be comprised of repeating units derived from terephthalic acid, p-hydroxybenzoic acid, 6-oxy-2-naphthoic acid, and an arylene diol (such as biphenol) in the mole ratio of approximately 1:3:.1–.15:1.

BLEND EXAMPLES

Controls 1–5 and Examples 35–51

The following Tables I, II, III, IV and V illustrate blends according to the present invention in comparison with controls prepared from a single LCP resin. Specifically, the items identified in the tables as Controls 1–5 are comparative examples of single component LCPs (compounded with filler) based on the LCP polyesters reported in Examples 6, 30 and 34, above. The items identified in the Tables as Examples 35–51 are compounded blends according to the present invention which were prepared using, as the first component of the blend, the LCP of Example 6, and as the second component, the LCP of either Example 30 or Example 34.

The Example 35–51 blends reported in the tables below were prepared on a Werner & Pfleiderer 53 mm twin screw extruder under the following conditions:

| | | |
|---|---|---|
| Zone Temperatures (F.): | Barrel zone 1 | 640° |
| | Barrel zone 2 | 660° |
| | Barrel zone 3 | 650° |
| | Barrel zone 4 | 650° |
| | Barrel zone 5 | 650° |
| | Barrel zone 6 | 635° |
| | Die zone 1 | 715° |
| | Die zone 2 | 715° |
| Screw rpm | 170 | |
| Melt, Temperature (F.) | 720°–734° | |
| Vacuum: | Applied devolatilizing vacuum 23–27" Hg | |

The blends can be obtained either by blending all of the resin and filler ingredients for a desired blend compound, or by separately compounding pellets based on each LCP component, and then mixing the compounded pellets in desired proportions at the injection molding machine.

Each of the blends reported in the tables below can be injection molded on conventional injection molding machinery. The conditions used for injection molding were as follows:

| | |
|---|---|
| Rear zone: | 340–350° C. |
| Center zone: | 340–355° C. |
| Front zone | 335–350° C. |
| Nozzle: | 330–340° C. |
| Mold Temperature: | 66–177° C. |
| Melt Temp: | 335–350° C. |
| Injection Pressure: | 20,000 psi |
| Injection Speed: | 1.5 to 5 in/sec. |
| Recommended shot size/Barrel volume ratio >0.30 | |

Table I sets forth the composition of the controls and the blends.

Table II reports tensile strength, tensile modulus, tensile elongation, flexural strength, flexural modulus, unnotched Izod, and HDT for the blends and controls.

Table III reports warpage data on the controls and blends.

Table IV sets forth X-ray crystallization data for the blends and the controls.

Table V outlines the results of a visual weld line inspection made on a molded article prepared from control 4 versus the same article prepared from Examples 41 and 45.

TABLE I

| | Compounded Blends | | | | | | | | |
|---|---|---|---|---|---|---|---|---|---|
| Example No. | 1st component (wt. %) Ex. 6 LCP | 2nd Component (wt. %) Ex. 30 LCP | Ex. 34 LCP | Flow Modifier (wt. %)[c] | Type of Glass Fiber | wt. % Glass Fiber | Carbon Black (wt. %) | Glass Beads (wt. %) | PTFE (wt. %) |
| Control 1 (a) | 0 | 68 | 0 | 0 | [b]milled glass | 29.00 | 0 | 0 | 0 |
| Control 2 | 56.5 | 0 | 0 | 0 | OC-497EE | 41.50 | 2.00 | 0 | 0 |
| Control 3 | 0 | 70 | 0 | 0 | OC-497EE | 28.00 | 2.00 | 0 | 0 |
| Control 4 | 0 | 70 | 0 | 0 | H & F 3004 | 28.00 | 2.00 | 0 | 0 |
| Control 5 | 0 | 0 | 70 | 0 | — | 30.00 | 0 | 0 | 0 |
| 35 | 49.00 | 8.60 | 0 | 0 | OC-497EE | 39.40 | 2.00 | 0 | 1.00 |
| 36 | 46.60 | 12.40 | 0 | 0 | OC-497DB | 38.00 | 2.00 | 0 | 1.00 |
| 37 | 46.10 | 12.20 | 0 | 0 | OC-497EE | 38.70 | 2.00 | 0 | 1.00 |
| 38 | 41.96 | 13.98 | 0 | 0 | OC-497EE | 41.08 | 1.98 | 0 | 1.00 |
| 39 | 39.95 | 17.31 | 0 | 2.07 | OC-497EE | 28.47 | 2.00 | 9.20 | 1.00 |
| 40 | 41.95 | 17.33 | 0 | 0 | OC-497EE | 37.74 | 1.98 | 0 | 1.00 |
| 41 | 37.29 | 23.10 | 0 | 0 | OC-497EE | 36.63 | 1.98 | 0 | 1.00 |
| 42 | 27.97 | 27.97 | 0 | 0 | OC-497EE | 41.08 | 1.98 | 0 | 1.00 |
| 43 | 26.63 | 34.65 | 0 | 1.39 | OC-497EE | 28.22 | 1.98 | 6.13 | 1.00 |
| 44 | 12.40 | 46.60 | 0 | 0 | OC-497EE | 38.00 | 2.00 | 0 | 1.00 |
| 45 | 11.19 | 55.44 | 0 | 0 | OC-497EE | 30.39 | 1.98 | 0 | 1.00 |
| 46 | 46.05 | 0 | 12.25 | 0 | chopped | 39.07 | 1.63 | 0 | 1.00 |
| 47 | 45.96 | 0 | 15.33 | 0 | chopped | 36.17 | 1.54 | 0 | 1.00 |
| 48 | 31.86 | 0 | 31.85 | 0 | chopped | 34.17 | 1.12 | 0 | 1.00 |
| 49 | 28.00 | 0 | 34.65 | 0 | chopped | 35.39 | 0.96 | 0 | 1.00 |
| 50 | 16.67 | 0 | 48.65 | 0 | chopped | 33.09 | 0.59 | 0 | 1.00 |
| 51 | 16.58 | 0 | 49.77 | 0 | chopped | 32.01 | 0.64 | 0 | 1.00 |

TABLE I-continued

Compounded Blends

| Example No. | 1st component (wt. %) Ex. 6 LCP | 2nd Component (wt. %) Ex. 30 LCP | Flow Modifier Ex. 34 LCP (wt. %)[c] | Type of Glass Fiber | wt. % Glass Fiber | Carbon Black (wt. %) | Glass Beads (wt. %) | PTFE (wt. %) |
|---|---|---|---|---|---|---|---|---|

[a](*)Control 1 includes 3% $TiO_2$.
[b]Henry and Frick 3004
[c]LCP from IA/PHBA/Biphenol 1:3:1--per U.S Pat. No. 4,563,508

TABLE II

Blend Properties

| Example (See Table I for blend Compositions) | Tensile strength (psi) | Tensile Modulus (psi × $10^6$) | Tensile Elongation (percent) | Flex Strength (psi) | Flex Modulus (psi × $10^6$) | Unnotched Izod (Ft-Lb/inch) | HDT at 264 psi (°C.) |
|---|---|---|---|---|---|---|---|
| Control 1 | 16900 | 1.70 | 2.60 | 21700 | 1.68 | 18.00 | 251 |
| Control 2 | 19466 | 3.10 | 0.89 | 27569 | 2.62 | 4.13 | 295 |
| Control 3 | 17450 | 2.11 | 1.70 | 24215 | 1.73 | 10.60 | 273 |
| Control 5 | 18723 | 2.14 | 1.61 | 24860 | 2.00 | 7.00 | 266 |
| 35 | — | — | — | 27427 | 2.36 | 2.70 | 255 |
| 36 | 18820 | 3.49 | 1.13 | 22619 | 2.12 | 3.06 | 241 |
| 37 | — | — | — | 26294 | 2.13 | 2.00 | 258 |
| 38 | — | — | — | — | — | — | — |
| 39 | — | — | — | — | — | — | — |
| 40 | — | — | — | 27118 | 2.01 | 2.30 | 263 |
| 41 | — | — | — | 27884 | — | 5.40 | 215 |
| 42 | — | — | — | — | — | — | — |
| 43 | — | — | — | — | — | — | — |
| 44 | 21240 | 2.89 | 1.53 | 27041 | 2.28 | 8.32 | 241 |
| 45 | — | — | — | 26261 | — | 7.60 | 245 |
| 46 | — | — | — | 28164 | 2.63 | 2.70 | 263 |
| 47 | 14930 | 3.19 | 0.91 | — | — | — | 260 |
| 48 | 19210 | 3.10 | 1.21 | — | — | — | 254 |
| 49 | — | — | — | 28131 | — | 5.20 | — |
| 50 | — | — | — | 28705 | — | 4.50 | — |
| 51 | 18330 | 2.56 | 1.48 | — | — | — | 234 |

TABLE III

CONNECTOR WARPAGE

| (See Table I for Blend Compositions) Example No. | *Connector #1 Warp (in. × $10^{-3}$) | **Connector #2 Warp (in. × $10^{-3}$) |
|---|---|---|
| Control 1 | 11.3 | 4.1 |
| Control 5 | 7.5/9.5 | 6.0 |
| [a]35 | 6.1 | 5.0 |
| 36 | 5.8 | 2.0 |
| 37 | 6.1 | — |
| 38 | 7.5 | — |
| 39 | 7.1 | 2.2 |
| 40 | 5.1 | — |
| 41 | 6.9 | 3.0 |
| 42 | 6.8 | — |
| 43 | 6.1 | — |
| 44 | 7.1 | 2.4 |
| 45 | 6.6 | — |
| [b]46 | — | 3.5 |
| 47 | 8.0 | — |
| 48 | 7.1 | — |
| 51 | 6.6 | — |

*30 position single slot electrical connector.
**Dual row 30 position electrical connector.
[a]Blends 35–45 incorporate the resin of Control 1 as the second resin component of the blend.
[b]Blends 46–48 and 51 incorporate the resin of Control 5 as the second resin component of the blend.

TABLE IV

X-Ray Crystallization Data

| Example No. (See Table I for Blend Compositions) | Cryst. Rate counts/sec | 1st Melting Point (°C.) | 1st Cryst. Point (°C.) | 2nd Melting Point (°C.) | 2nd Cryst. Point (°C.) |
|---|---|---|---|---|---|
| Control 2 | 212 | 398 | 282 | 352 | 261 |
| Control 3 | 396 | 354 | 309 | 354 | 302 |
| Control 5 | 565 | 358 | 324 | 370 | 324 |
| 35 | 106 | 373 | 269 | 325 | 237 |
| 37 | 106 | 371 | 277 | 297 | 246 |
| 40 | 127 | 373 | 269 | 306 | 266 |
| 41 | 57 | 343 | 268 | 306 | 268 |
| 45 | 170 | 363 | 302 | 349 | 273 |
| 46 | 113 | 354 | 284 | 308 | 248 |
| 47 | 32 | 364 | 284 | 302 | 284 |
| 50 | 95 | 354 | 293 | 302 | 293 |

TABLE V

WELD LINE IMPROVEMENT IN THIN-WALLED CONNECTOR

| Example No. (See Table I for blend Compositions) | Description of Weld lines at Connector hole corners |
|---|---|
| Control No. 4 | weld line visually detectable |
| 41 | no visible weld lines |
| 45 | no visible weld lines |

EXAMPLES 52–54

X-Ray Measurements on Neat Blends

Table VI below sets forth the results of X-ray diffraction measurements on neat blends (Examples 52–54) in which the first component is the LCP resin of Example 6 and the second component is the LCP resin of Example 30. X-ray data are also presented for the Example 6 resin alone (Control 6) and the Example 30 resin alone (Control 7). The compositions of the neat resins were as follows:

| Example No | Ex. 6 LCP (wt. %) | Ex. 30 LCP (wt. %) |
|---|---|---|
| Control 6 | 100 | 0 |
| 52 | 79 | 21 |
| 53 | 50 | 50 |
| 54 | 21 | 79 |
| Control 7 | 0 | 100 |

The blends of Examples 52–54 were prepared on a Haake Rheometer at a melt temperature of 385° C. and residence time of 10 minutes. High temperature X-ray diffraction scans were made to determine the temperature at which crystallinity disappears on heating and reappears on cooling for the two control samples and three invention samples identified above. Samples of the neat resins were ground to a fine powder before analysis by grinding against wet 240-grid carbide paper to form a slurry which was then dried at 100° C. Preliminary scans were made over the angular range of 15 to 25 degrees two theta, and a temperature of 150° to 450° C. to determine the angular dependency on temperature of the 4.5 angstrom diffraction peak for chain packing. This data was used to fit a second-degree polynomial equation. Fit parameters were used to track goniometer angle as the sample temperature was scanned at 100° C. per minute from 150° to 400° C. for two cycles. To improve the count rate, the exit slit of the diffractometer was removed. This resulted in approximately a factor of four improvement in count rate. Crystallization rates were determined by measurement of the increase in count rate as the sample is cooled 40° C. below the onset of crystallization. The resulting thermal X-ray diffraction data are shown in the following Table VI

TABLE VI

X-Ray Data on Neat Blends

| Example No. | 1st Melt. Temp. (°C.) | 2nd Melt. Temp. (°C.) | 1st Cryst. Temp. (°C.) | 2nd Cryst. Temp. (°C.) | Cryst. Temp. (°C.) |
|---|---|---|---|---|---|
| Control 6 | 373 | 357 | 292 | 289 | 528 |
| 52 | 353 | 340 | 281 | 281 | 282 |
| 53 | 313 | 299 | 247 | 247 | 479 |
| 54 | 319 | 308 | 268 | 268 | 1970 |
| Control 7 | 346 | 353 | 304 | 304 | 3650 |

EXAMPLES 55-57

Weld Strength and Other Properties of Neat Blends

Table VII below reports properties, including weld strength, of neat blends according to the invention wherein the first component is the LCP resin of Example 6 and the second component is the LCP resin of Example 30. The blends were pelletized on a 1" Killion single screw extruder. The pelletized blends were dried for 16 hours in a circulating air oven at 300° F. and subsequently injection molded on a 30-ton BOY injection molding machine having a 1¾ ounce barrel. The temperature of the zone nearest the throat ranged from 320° to 360° C.; the next zone after that had a temperature of 350° to 365° C.; the next zone (the one nearest the nozzle) had a temperature range from 355° to 370° C., while the nozzle had a temperature range from 365° to 380° C. Double-gated and single gated tensile bars (per ASTM D-638) were made using full injection speed with the injection pressure of 35 bar (510 psi). The parts were conditioned for 40 hours at room temperature and at 50% relative humidity. The parts were then tested on an MTS® tensile tester at 0.5 inches per minute. A strain gauge was used to measure tensile elongation and modulus. The data in the below Table VII is an average of five tests on each sample. For Control 6 and Control 7 the parts were breaking at the weld line after they were ejected from the mold.

nent is the LCP resin of Example 32. The crystallization rate, onset of crystallization and melting temperature were obtained in the same manner as described above.

TABLE VIII

X-Ray Crystallization Data on Neat Blends Incorporating a 1/2/1 TA/PHBA/Biphenol LCP

| Example No | Control 8 | 58 | 59 | 60 | Control 6 |
|---|---|---|---|---|---|
| Wt. % LCP Resin of | 100 | 75 | 50 | 25 | 0 |
| Wt. % LCP Resin of | 0 | 25 | 50 | 75 | 100 |
| 1st Melting Point (°C.) | 484 | 430 | 432 | 436 | 365 |
| 2nd Melting Point (°C.) | 446 | 422 | 423 | 422 | 335 |
| 1st Cryst. Temp (°C.) | 397 | 383 | 380 | 376 | 307 |
| 2nd Cryst. Temp (°C.) | 390 | 383 | 378 | 389 | 301 |
| Cryst. Rate (cpm) | 3710 | 1908 | 1554 | 721 | 841 |
| % Crystallinity | 52 | 37 | 30 | 25 | 28 |

TABLE VII

Properties of Neat Blends

| Example No. | Control 6 | 55 | 56 | 57 | Control 7 |
|---|---|---|---|---|---|
| Wt. % LCP of Ex 6 | 100 | 75 | 50 | 25 | 0 |
| Wt. % LCP of Example 30 | 0 | 25 | 50 | 75 | 100 |
| HDT (264 psi) (°C.) | 233 | 176 | 164 | 187 | 238 |
| Tensile Strength (psi) | 15000 | 15500 | 15200 | 16200 | 16500 |
| Tensile Elongation (%) | 0.75 | 0.76 | 1.02 | 1.14 | 1.00 |
| Tensile Modulus (psi × $10^6$) | 2.22 | 2.54 | 1.88 | 1.85 | 2.48 |
| Weld Line Strength (psi) | part separated at weld line | 1600 | 2000 | 1700 | part separated at weld line |
| Flex Strength (psi) | 26800 | 23100 | 20200 | 19400 | 19300 |
| Flex Modulus (psi × $10^6$) | 1.96 | 1.47 | 1.13 | 1.10 | 1.26 |
| NoNotch Izod (ft-lbs/in) | 7.35 | — | 22.2 | 27.4 | 31.5 |
| Notched Izod (ft-lbs/in) | 0.79 | — | 5.4 | 7.0 | 9.0 |

EXAMPLES 58-60

X-Ray Crystallization Data for Neat Blends in which the Second Component is a TA:PHBA:Biphenol 1/2/1 LCP Table VIII sets forth crystallization data for neat blends according to the present invention wherein the first component is the LCP resin of Example 6 and the second compo-

EXAMPLES 61-65

Ternary LCP blends with Polyetherimide

Table IX, below, sets forth the properties of ternary blends (neat, and compounded with 30% chopped long glass) according to the present invention. These blends use the LCP resin of Example 6 as the first component; the LCP resin of Example 30 as the second component; and Ultem 1000® polyetherimide obtained from General Electric as the third component. The blends were compounded on a 25-mm Berstorff twin screw extruder and injection molded on a 30 ton Boy injection molding machine. In compounding on the Berstorff, a general purpose screw was used. The vent closest to the throat was open to the atmosphere, while a vacuum was maintained on the vent closest to the die using a vacuum pump.

TABLE IX

Properties of Ternary Blends
(Third Component is Polyetherimide)

| Example No | Example 61 | Example 62 | Example 63 | Example 64 | Example 65 | Example 66 |
|---|---|---|---|---|---|---|
| Wt. % Ex 6 LCP | 20 | 18 | 16 | 14 | 12.6 | 11.2 |
| Wt. % Ex. 30 LCP | 80 | 72 | 64 | 56 | 50.4 | 44.8 |
| Ultem ® 1000 (wt. %) | — | 10 | 20 | — | 7.0 | 14.0 |
| chopped glass (a) (wt %) | — | — | — | 30 | 30.0 | 30.0 |
| Tensile strength (psi) | 17300 | 22500 | 20800 | 21600 | 17800 | 17400 |
| Tensile Elongation (%) | 1.20 | 2.37 | 2.33 | 1.69 | 1.60 | 1.62 |
| Tensile Modulus (psi × $10^6$) | 1.97 | 1.60 | 1.35 | 2.28 | 1.92 | 1.90 |
| Weld-Line Strength (psi) | 1920 | 2030 | 2350 | 3560 | 3470 | 3170 |
| Flex strength (psi) | 21100 | 22300 | 23800 | 30000 | 27100 | 26300 |
| Flex Modulus (psi × $10^6$) | 1.19 | 1.18 | 1.20 | 1.51 | 1.41 | 1.40 |
| NoNotch Izod (ft-lbs/in) | 20.6 | 21.7 | 1.6 | 10.7 | 8.9 | 7.4 |
| Notched Izod (ft-lbs/in) | 4.4 | 4.9 | 2.3 | 1.8 | 1.4 | 1.2 |
| HDT (264 psi) (°C.) | 200 | 194 | 191 | 233 | 231 | 224 |

(a) OC 497EE

We claim:

1. A polymeric blend composition comprising:

a first component which comprises a liquid crystalline polyester resin comprising the following repeating units (1), (2), (3), 4) and (5):

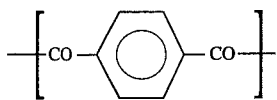 (1)

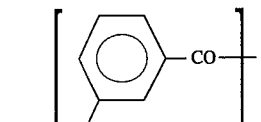 (2)

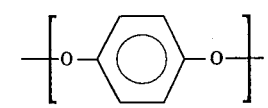 (3)

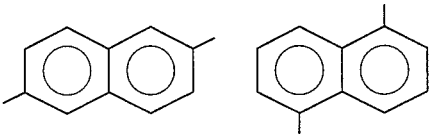 (4)

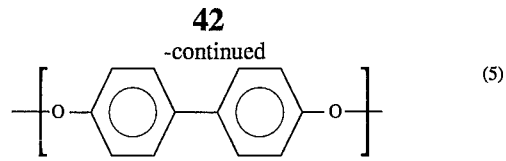 (5)

wherein the ratio of total number of units (1) to the total number of units (2) is from about 1.4:1 to about 10:1; the ratio of the total number of units 4) to the total number of units (5) is from about 3:1 to about 21:1; and the ratio of the total number of units (3) to the sum of the total number of units (1) and (2) is from about 0.6:1 to about 7:1; and a second polymeric component which comprises a wholly aromatic polyester comprising at least one recurring unit having the following general formula:

$$+X_1-Ar-X_2+$$

wherein —Ar— is selected from the group consisting of:

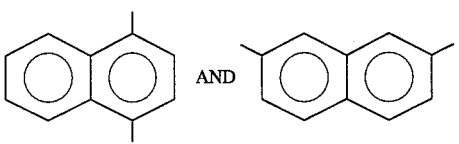

where —$X_1$— and —$X_2$— are independently selected from the group consisting of —O— and —CO—; the blend exhibiting a crystallization rate which is lower than the crystallization rate of at least one of the liquid crystalline polyesters thereof; and wherein the blend further comprises filler in an mount of from about 1 to about 70 percent by weight of the blend; the filler comprises at least one material selected from the group consisting of glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton, wool, and wood cellulose fibers, calcium silicate, silica, clays, talc, mica, carbon black, titanium dioxide, wollastonite, polytetrafluoroethylene, graphite, alumina trihydrate, sodium aluminum carbonate, barium ferrite, and glass beads.

2. The blend composition of claim 1 wherein the filler comprises long chopped glass fiber exhibiting an aspect ratio, in the compounded blend, of from about 7 to about 100.

3. The blend composition of claim 1 wherein the ratio of repeating units derived from hydroquinone to repeating units derived from biphenol is from about 10:1 to about 99:1; and the crystallization rate of the blend is lower than the crystallization rate of each of the liquid crystalline polyesters thereof.

4. The blend of claim 3 wherein the filler comprises long chopped glass fiber having an aspect ratio of about 10 to about 50, and wherein the fiber is present in an mount of from about 20 to about 50 percent by weight of composition.

5. A polymeric blend composition comprising:

a first component which comprises a liquid crystalline polyester resin comprising the following repeating units (1), (2), (3), (4) and (5):

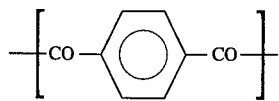 (1)

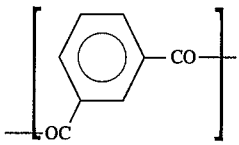 (2)

 (3)

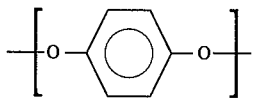 (4)

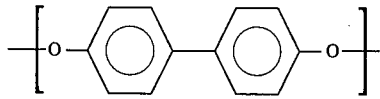 (5)

wherein the ratio of total number of units (1) to the total number of units (2) is from about 1.4:1 to about 10:1; the ratio of the total number of units (4) to the total number of units (5) is from about 3:1 to about 21:1; and the ratio of the total number of units (3) to the sum of the total number of units (1) and (2) is from about 0.6:1 to about 7:1; and a second polymeric component which comprises repeating units (6) and (7):

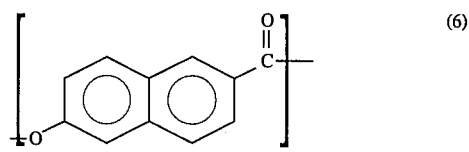 (6)

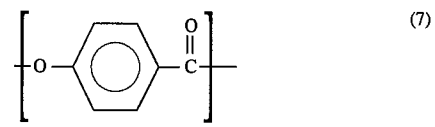 (7)

wherein said units may be substituted by one or more $C_1$ to $C_4$ alkyl groups, $C_1$ to $C_4$ alkoxy groups, or halogen atoms; and wherein the ratio of the number of units (6) to units (7) is from about 1:9 to about 9:1; the blend exhibiting a crystallization rate which is lower than the crystallization rate of at least one of the liquid crystalline polyesters thereof; and wherein the blend further comprises filler in an mount of from about 1 to about 70 percent by weight of the blend; and the filler comprises at least one material selected from the group consisting of glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton, wool, and wood cellulose fibers, calcium silicate, silica, clays, talc, mica, carbon black, titanium dioxide, wollastonite, polytetrafluoroethylene, graphite, alumina trihydrate, sodium aluminum carbonate, barium ferrite, and glass beads.

6. The blend composition of claim 5 wherein the filler comprises long chopped glass fiber exhibiting an aspect ratio, in the compounded blend, of from about 7 to about 100.

7. The blend composition of claim 5 wherein the ratio of repeating units derived from hydroquinone to repeating units derived from biphenol is from about 10:1 to about 99:1 and the crystallization rate of the blend is lower than the crystallization rate of each of the liquid crystalline polyesters thereof.

8. The blend of claim 7 wherein the filler comprises long chopped glass fiber having an aspect ratio of about 10 to about 50, and wherein the fiber is present in an mount of from about 20 to about 50 percent by weight of composition.

9. A polymeric blend composition comprising:

a first component which comprises a liquid crystalline polyester resin comprising the following repeating units (1), (2), (3), 4) and (5):

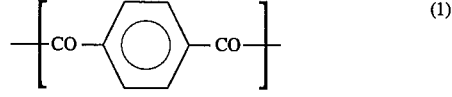 (1)

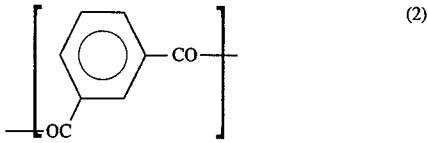 (2)

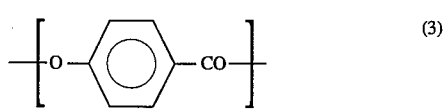 (3)

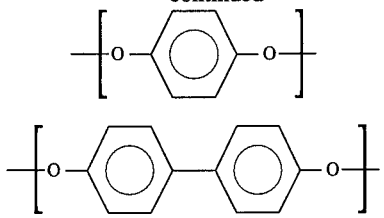 (4)

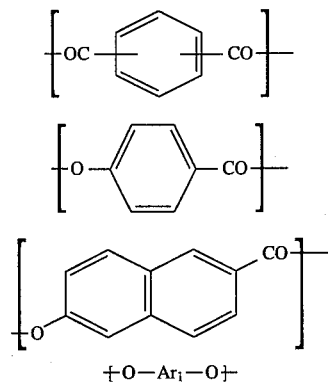 (5)

wherein the ratio of total number of units (1) to the total number of units (2) is from about 1.4:1 to about 10:1; the ratio of the total number of units (4) to the total number of units (5) is from about 3:1 to about 21:1; and the ratio of the total number of units (3) to the sum of the total number of units (1) and (2) is from about 0.6:1 to about 7:1; and a second component which comprises a liquid crystalline polyester resin different from the polyester resin of the first component; consisting essentially of repeating units (8), (9), (10) and (11):

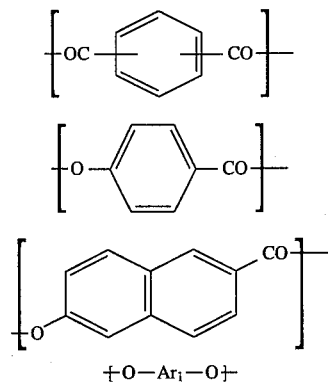

(8)

(9)

(10)

$+O-Ar_1-O+$ (11)

where —$Ar_1$— is at least one member selected from the group consisting of:

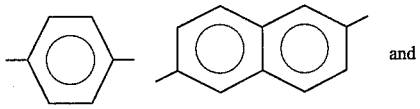 and

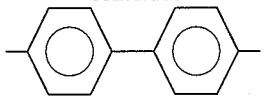

wherein unit (8) is derived from at least one member selected from the group consisting of terephthalic acid and isophthalic acid and the sum of the number of units (8) is approximately equal to the number of units (11); the blend exhibiting a crystallization rate which is lower than the crystallization rate of at least one of the liquid crystalline polyesters thereof; and wherein the blend further comprises filler in an mount of from about 1 to about 70 percent by weight of the blend; and the filler comprises at least one material selected from the group consisting of glass fibers, asbestos, graphitic carbon fibers, amorphous carbon fibers, synthetic polymeric fibers, aluminum fibers, aluminum silicate fibers, oxide of aluminum fibers, titanium fibers, magnesium fibers, rock wool fibers, steel fibers, tungsten fibers, cotton, wool, and wood cellulose fibers, calcium silicate, silica, clays, talc, mica, carbon black, titanium dioxide, wollastonite, polytetrafluoroethylene, graphite, alumina trihydrate, sodium aluminum carbonate, barium ferrite, and glass beads.

10. The blend composition of claim 9 wherein the filler comprises long chopped glass fiber exhibiting an aspect ratio, in the compounded blend, of from about 7 to about 100.

11. The blend of claim 9 wherein unit (8) is derived from terephthalic acid; unit (11) is derived from biphenol; the ratio of the total number of units (9) to units (11) is from about 2:1 to about 4:1; and wherein the ratio of the number of units (10) to the number of units (11) is from about 0.05:1 to about 15:1.

12. The blend of claim 11 wherein the filler comprises long chopped glass fiber having an aspect ratio of about 10 to about 50, and wherein the fiber is present in an mount of from about 20 to about 50 percent by weight of composition.

13. The blend composition of claim 11 wherein the first component has a ratio of repeating units derived from hydroquinone to repeating units derived from biphenol is from about 10:1 to about 9:1; and the crystallization rate of the blend is lower than the crystallization rate of each of the liquid crystalline polyesters thereof.

\* \* \* \* \*

UNITED STATES PATENT AND TRADEMARK OFFICE
CERTIFICATE OF CORRECTION

PATENT NO. : 5,492,946
DATED : Feb. 20, 1996
INVENTOR(S) : Paul J. Huspeni, et al Page 1 of 3

It is certified that error appears in the above-indentified patent and that said Letters Patent is hereby corrected as shown below:

| Col. | Line | |
|---|---|---|
| 17 | 54 | "allcyclic diols," should read --alicyclic diols,-- |
| 27 | 11 | in the entitled table "Example 6" underneath the line "G ---- 0.007" patent reads "ratio of hydrocruinone to biphenol:" patent should read --ratio of hydroquinone to biphenol:-- |
| 32 | 26 | "acetic acid item F was then added" should read --acetic acid. Item F was then added-- |
| 32 | 48 | "oxybenzoyl moieties" should read --oxybenzoyl moieties-- |
| 34 | 22 | in the last line of the table patent reads "Recommended shot size/Barrel volume ratio >0.30" patent should read --Recommended shot size/Barrel volume ratio ≥0.30-- |
| 37 | 29 | in "TABLE V" "weld line visually detectable" should read --weld lines visually detectable-- |

UNITED STATES PATENT AND TRADEMARK OFFICE
CERTIFICATE OF CORRECTION

PATENT NO. : 5,492,946
DATED : Feb. 20, 1996
INVENTOR(S) : Paul J. Huspeni, et al Page 2 of 3

It is certified that error appears in the above-indentified patent and that said Letters Patent is hereby corrected as shown below:

| Col. | Line | |
|---|---|---|
| 39 | 40 | in "TABLE VII" in the row labelled "55" patent reads "15500" patent should read --15800-- |
| 40 | 14 | in "TABLE VIII" in the row labelled "Example No." patent reads "Wt.% LCP Resin of" patent should read --Wt.% LCP Resin of Ex. 32-- |
| 40 | 15 | in the same "TABLE VIII" and row "Example No." patent reads "Wt.% LCP Resin of" patent should read --Wt.% LCP Resin of Ex. 6-- |
| 40 | 21 | in the same "TABLE VIII" and in row "60" patent reads "389" patent should read --380-- |
| 41 | 30 | in "TABLE IX" in the row "Example 63" patent reads "1.6" patent should read --11.6-- |
| 43 | 1 | "filler in an mount" should read --filler in an amount-- |

UNITED STATES PATENT AND TRADEMARK OFFICE
CERTIFICATE OF CORRECTION

PATENT NO. : 5,492,946
DATED : Feb. 20, 1996
INVENTOR(S) : Paul J. Huspeni, et al It is certified that error appears in the above-indentified patent and that said Letters Patent is hereby corrected as shown below:

| Col. | Line | |
|---|---|---|
| 43 | 29 | "fiber is present in an mount" should read --fiber is present in an amount-- |
| 44 | 20 | "filler in an mount" should read --filler in an amount-- |
| 44 | 46 | "fiber is present in an mount" should read --fiber is present in an amount-- |
| 46 | 13 | "filler in an mount" should read --filler in an amount-- |
| 46 | 38 | "fiber is present in an mount" should read --fiber is present in an amount-- |
| 46 | 43 | "about 10:1 to about 9:1;" should read --about 10:1 to about 99:1;-- |

Signed and Sealed this

Seventeenth Day of September, 1996

BRUCE LEHMAN

Attest:

Attesting Officer

Commissioner of Patents and Trademarks